(12) United States Patent
Forbes et al.

(10) Patent No.: US 11,905,067 B1
(45) Date of Patent: Feb. 20, 2024

(54) CHARGING SYSTEM FOR PORTABLE ELECTRONIC DEVICES

(71) Applicant: Pioneer Square Brands, Inc., Seattle, WA (US)

(72) Inventors: Quentin Wade Forbes, Winston Salem, NC (US); Sudeep Balkrishna Agalgaonkar, Jamestown, NC (US); Riley Edwin Lynch, Greensboro, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 18/142,569

(22) Filed: May 2, 2023

(51) Int. Cl.
| | | |
|---|---|---|
| *B65D 21/08* | (2006.01) | |
| *B65D 25/10* | (2006.01) | |
| *H02J 7/00* | (2006.01) | |
| *B65D 71/70* | (2006.01) | |

(52) U.S. Cl.
CPC ............ *B65D 21/08* (2013.01); *B65D 25/10* (2013.01); *B65D 25/101* (2013.01); *B65D 71/70* (2013.01); *H02J 7/0044* (2013.01)

(58) Field of Classification Search
CPC ...... B65D 25/101; B65D 25/10; B65D 21/08; H02J 7/0044

USPC ............. 221/60; 206/814; 320/110; 220/559, 220/812, 813, 811
See application file for complete search history.

(56) References Cited

U.S. PATENT DOCUMENTS

| | | | | |
|---|---|---|---|---|
| 5,148,094 | A * | 9/1992 | Parks ..................... | H02J 7/0045 320/110 |
| 6,124,699 | A * | 9/2000 | Suzuki .................. | H02J 7/0045 429/100 |
| 6,129,237 | A * | 10/2000 | Miyahara .............. | G06F 1/1626 220/255 |
| 7,866,504 | B2 * | 1/2011 | Okada ..................... | B60R 7/04 220/811 |
| 9,276,423 | B2 * | 3/2016 | Yang ..................... | H02J 7/0045 |

* cited by examiner

*Primary Examiner* — John K Fristoe, Jr.
*Assistant Examiner* — Jennifer Castriotta
(74) *Attorney, Agent, or Firm* — Grandview Law

(57) ABSTRACT

A holder includes a container and a curvilinear formed semi-rigid sheet coupled to curvilinear slots of opposing sides of the container to primarily move inside of the container as guided by the curvilinear slots to provide a self-adjusting container depth through spring tensioning to accommodate various thicknesses of portable electronic devices contained thereby.

20 Claims, 28 Drawing Sheets

CHARGING SYSTEM FOR PORTABLE ELECTRONIC DEVICES

SUMMARY

In one or more aspects a system for a portable electronic computing device including (I) a container assembly including (A) a first side, and (B) a second side, wherein the first side and the second side being opposingly spaced from one another; and (II) a curvilinearly formed semi-rigid sheet including a first axis of rotation, wherein the curvilinearly formed semi-rigid sheet being pivotally coupled to the first side and the second side of the container along the first axis of rotation. Wherein the curvilinearly formed semi-rigid sheet includes a second axis of rotation, and wherein the curvilinearly formed semi-rigid sheet being pivotally coupled to the first side and the second side of the container along the second axis of rotation. Wherein the curvilinearly formed semi-rigid sheet includes a first side and a second side, wherein the first side of the curvilinearly formed semi-rigid sheet includes a first aperture, and a second aperture, wherein the second side of the curvilinearly formed semi-rigid sheet includes a third aperture, and a fourth aperture, wherein the second axis of rotation of the curvilinearly formed semi-rigid sheet being extended between the second aperture of the first side of the curvilinearly formed semi-rigid sheet and the third aperture of the second side of the curvilinearly formed semi-rigid sheet, wherein the second aperture of the curvilinearly formed semi-rigid sheet being pivotally coupled to the first side of the container assembly, and wherein the third aperture of the curvilinearly formed semi-rigid sheet being pivotally coupled to the second side of the container assembly. Wherein the first side of the container includes an aperture, wherein the second side of the container includes an aperture, wherein the second aperture of the first side of the curvilinearly formed semi-rigid sheet includes being pivotally coupled with the aperture of the first side of the container, and wherein the third aperture of the second side of the curvilinearly formed semi-rigid sheet includes being pivotally coupled with the aperture of the second side of the container. Wherein the first axis of rotation of the curvilinearly formed semi-rigid sheet being extended between the first aperture of the first side of the curvilinearly formed semi-rigid sheet and the fourth aperture of the second side of the curvilinearly formed semi-rigid sheet, wherein the first aperture of the first side of the curvilinearly formed semi-rigid sheet being pivotally coupled to the first side of the container assembly, and wherein the fourth aperture of the second side of the curvilinearly formed semi-rigid sheet being pivotally coupled to the second side of the container assembly. Wherein the curvilinearly formed semi-rigid sheet includes a first axis of translation, and wherein the curvilinearly formed semi-rigid sheet being translationally coupled to the first side and the second side of the container along the first axis of translation. Wherein the curvilinearly formed semi-rigid sheet includes a first axis of translation, wherein the first axis of translation of the curvilinearly formed semi-rigid sheet being extended between the first aperture of the first side of the curvilinearly formed semi-rigid sheet and the fourth aperture of the of the second side of the curvilinearly formed semi-rigid sheet, wherein the first aperture of the first side of the curvilinearly formed semi-rigid sheet being translationally coupled to the first side of the container assembly, and wherein the fourth aperture of the second side of the aperture of the curvilinearly formed semi-rigid sheet being translationally coupled to the second side of the container assembly. Wherein the first side of the container includes a curvilinear slot, wherein the second side of the container includes a curvilinear slot, wherein the first aperture of the first side of the curvilinearly formed semi-rigid sheet includes being pivotally and translationally coupled with the curvilinear slot of the first side of the container, and wherein the fourth aperture of the second side of the curvilinearly formed semi-rigid sheet includes being pivotally and translationally coupled with the curvilinear slot of the second side of the container. Further including further including a first spring having a first and second end; and a first spring having a first and second end, wherein the first end of the first spring is coupled to the first side of the container, wherein the first end of the second spring is coupled to the second side of the container, wherein the second end of the first spring is coupled to the first aperture of the first side of the curvilinearly formed semi-rigid sheet, and wherein the second end of the second spring is coupled to the fourth aperture of the second side of the curvilinearly formed semi-rigid sheet. Wherein the curvilinear slot of the first side of the container includes a first end and a second end, and wherein the curvilinear slot of the first side of the container being one continuous curve of varying radius of curvature including a first radius of curvature closer to the first end of the curvilinear slot than the second end of the curvilinear slot and a second radius of curvature closer to the second end of the curvilinear slot than the first end of the curvilinear slot, the first radius of curvature being smaller than the second radius of curvature. Wherein the container assembly further includes a third side opposingly spaced from the curvilinearly formed semi-rigid sheet, and wherein the curvilinearly formed semi-rigid sheet being positionally adjustable for variation of closest distance between the curvilinearly formed semi-rigid sheet and the third side. Wherein the curvilinearly formed semi-rigid sheet includes a plurality of portions, and wherein the plurality of portions of the curvilinearly formed semi-rigid sheet includes a different portion being closest to the third side of the container as the closest distance changes between the curvilinearly formed semi-rigid sheet and the third side of the container. Further including at least one first semi-rigid member; and at least one second semi-rigid member, wherein the at least one first semi-rigid member being coupled to first side of the container, wherein the at least one first semi-rigid member being adjustably extended from the first side of the container toward the second side of the container, wherein the at least one second semi-rigid member being coupled to second side of the container, and wherein the at least one second semi-rigid member being adjustably extended from the second side of the container toward the first side of the container. Further including a base, wherein the base being perpendicularly oriented with respect to the first side and the second side of the container, and wherein the base includes a device interface.

In one or more aspects a system for a portable electronic device including (I) a container assembly including a side; and (II) a semi-rigid sheet coupled with the container, the semi-rigid sheet includes a plurality of portions, wherein semi-rigid sheet being positionally adjustable for variation of a closest distance between the semi-rigid sheet and the side of the container, and wherein the plurality of portions of the semi-rigid sheet includes a different portion being closest to the side of the container as the closest distance changes between the semi-rigid sheet and the side of the container. Wherein the semi-rigid sheet being curvilinear. Further including a base, wherein the container includes a first curvilinear slot and a second curvilinear slot, and wherein the semi-rigid sheet is movably coupled to the first curvilinear slot and the second curvilinear slot.

In one or more aspects a system for a portable electronic device including (I) a container assembly including (A) a first curvilinear slot, and (B) a second curvilinear slot, wherein the first curvilinear slot and the second curvilinear slot being opposingly spaced from one another; and (II) a semi-rigid sheet moveably coupled with the first curvilinear slot and the second curvilinear slot. Wherein the first curvilinear slot includes a first end and a second end, and wherein the first curvilinear slot being one continuous curve of varying radius of curvature including a first radius of curvature closer to the first end of the first curvilinear slot than the second end of the first curvilinear slot and a second radius of curvature closer to the second end of the first curvilinear slot than the first end of the first curvilinear slot, the first radius of curvature being smaller than the second radius of curvature. Wherein the container assembly includes a side, wherein the semi-rigid sheet includes a plurality of portions, wherein semi-rigid sheet being positionally adjustable for variation of a closest distance between the semi-rigid sheet and the side of the container, and wherein the plurality of portions of the semi-rigid sheet includes a different portion being closest to the side of the container as the closest distance changes between the semi-rigid sheet and the side of the container.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Charging System for Portable Electronic Devices, articles of manufacture, compositions of matter for same that may provide context, for instance, in introducing one or more processes and/or devices described herein.

DETAILED DESCRIPTION

Figure 1:
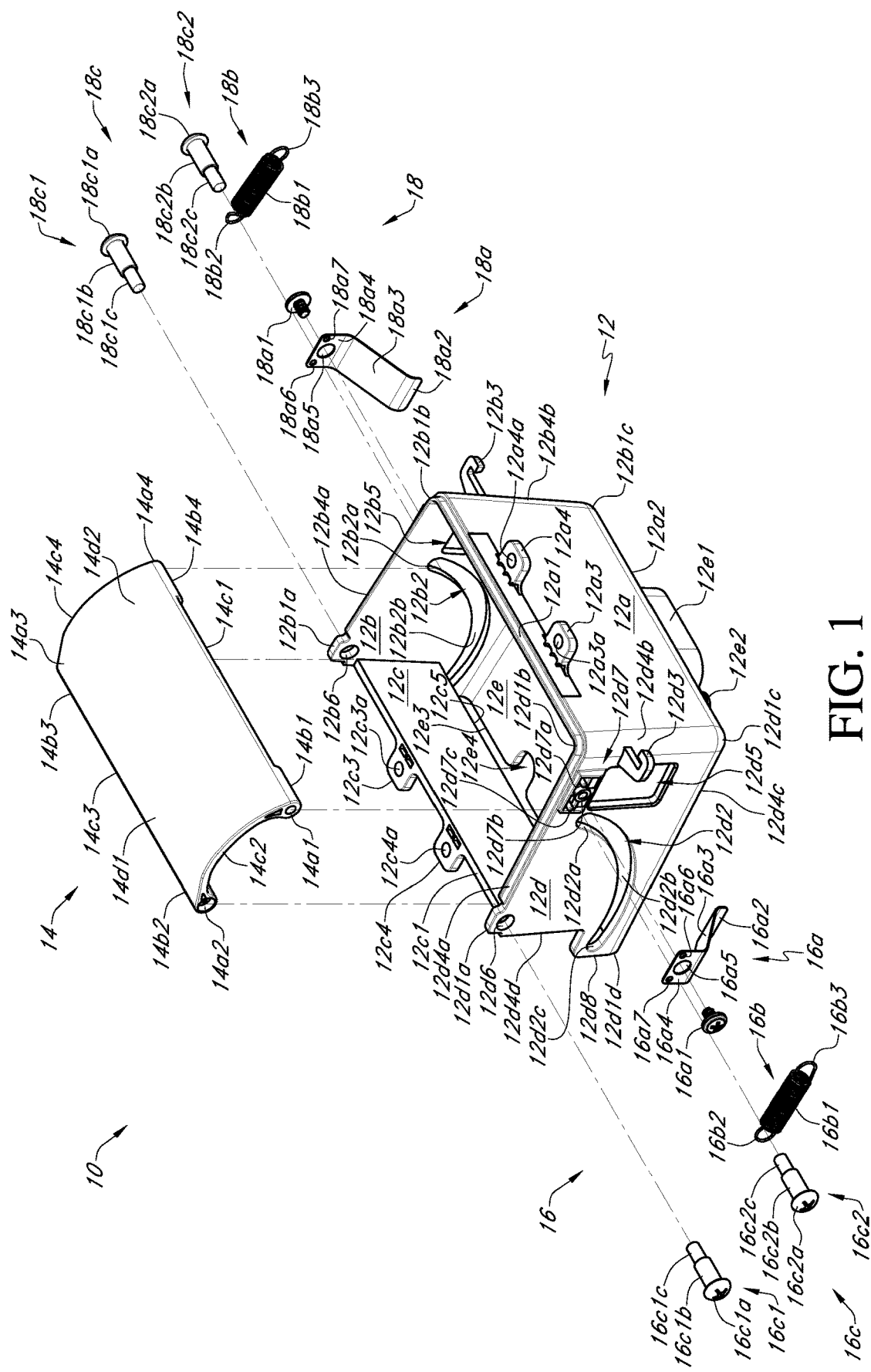
FIG. 1 is an exploded left top front perspective view of a holder for a portable electronic device.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is an exploded left top front perspective view of holder assembly 10. Depicted implementation of holder assembly 10 is shown to include container assembly 12, curvilinearly formed semi-rigid sheet assembly 14, side assembly 16, and side assembly 18.

Depicted implementation of container assembly 12 (e.g. box assembly) is shown to include side portion 12a, side portion 12b, side portion 12c, side portion 12d, and base portion 12e shown to in part bound an interior area with each of their interior surface portions. In implementations, side portion 12a and side portion 12c are opposingly spaced from one another and side portion 12b and side portion 12d are opposingly spaced from one another. As shown side portion 12a, side portion 12b, side portion 12c, side portion 12d have exterior surface portions facing away from the interior area. As depicted, base portion 12e is being planarly formed to include an interior surface portion occupying a portion of a plane. Implementations of one or more portions of container assembly 12 can include at least one of the following materials: rigid plastic, polycarbonate, acrylonitrile butadiene styrene, thermoplastic polymer, thermoplastic polyurethane, polyethylene terephthalate, and nylon.

Depicted implementation of side portion 12a is shown to include edge 12a1, edge 12a2, protrusion 12a3 with aperture 12a3a, and protrusion 12a4 with aperture 12a4a. As shown, protrusion 12a3 and protrusion 12a4 have top surface portions and bottom surface portions (in implementations depicted as flat), in which the top surface portion are positioned at a first elevation value with respect to when the interior surface portion of the base portion is being horizontally positioned, the bottom surface portion being positioned at a second elevation value with respect to when the interior surface portion of the base portion is being horizontally positioned, the first elevation value of the top surface portion being greater than the second elevation value of the bottom surface portion.

Depicted implementation of side portion 12b is shown to include protrusion 12b1a, corner 12b1b, and corner 12b1c. Depicted implementation of side portion 12b is shown to include curvilinear slot 12b2 with end portion 12b2a and with mid portion 12b2b. Depicted implementation of side portion 12b is shown to include hook 12b3, edge 12b4a, edge 12b4b, aperture 12b5, and aperture 12b6.

Depicted implementation of side portion 12c is shown to include edge 12c1, protrusion 12c3 with aperture 12c3a, protrusion 12c4 with aperture 12c4a, and edge 12c5. As shown, protrusion 12c3 and protrusion 12c4 have top surface portions and bottom surface portions (in implementations depicted as flat), in which the top surface portion are positioned at a first elevation value with respect to when the interior surface portion of the base portion is being horizontally positioned, the bottom surface portion being positioned at a second elevation value with respect to when the interior surface portion of the base portion is being horizontally positioned, the first elevation value of the top surface portion being greater than the second elevation value of the bottom surface portion.

Depicted implementation of side portion 12d is shown to include protrusion 12d1a, corner 12d1b with corner 12d1c, and corner 12d1d. Depicted implementation of side portion 12d is shown to further include curvilinear slot 12d2 with end portion 12d2a, mid portion 12d2b, end portion 12d2c, and is further shown to include hook 12d3. Both curvilinear slot 12b2 and curvilinear slot 12d2 are shown to each include being one continuous curve of varying radius of curvature including a first radius of curvature closer to a first end (e.g., end portion 12d2a) than a second end (e.g., end portion 12d2c), and a second radius of curvature closer to the second end (e.g., end portion 12d2c) wherein the first radius of curvature being smaller than the second radius of curvature.

Depicted implementation of side portion 12d is further shown to include edge 12d4a, edge 12d4b, edge 12d4c, and edge 12d4d. Depicted implementation of side portion 12d is further shown to include aperture 12d5, aperture 12d6 and coupler 12d7, with stem 12d7a, aperture 12d7b, and stem 12d7c, and is shown to further include protrusion 12d8 and corner 12d1d. Depicted implementation of base portion 12e is shown to include device interface rear 12e1, device interface front 12e2, edge 12e3, and notch 12e4.

Depicted implementation of curvilinearly formed semi-rigid sheet assembly 14 is shown to include corner aperture 14a1, corner aperture 14a2, corner aperture 14a3, and corner aperture 14a4. In implementations curvilinearly formed semi-rigid sheet assembly 14 is coupled with container assembly 12 to include shown a first axis of rotation including through corner aperture 14a1 and corner aperture 14a4 about curvilinear slot 12d2 and curvilinear slot 12b2, respectively wherein curvilinear slot 12d2 and curvilinear slot 12b2 are shown as opposingly spaced from one another and curvilinearly formed semi-rigid sheet assembly 14 is shown to be movably couplable to curvilinear slot 12d2 and curvilinear slot 12b2.

In implementations curvilinearly formed semi-rigid sheet assembly 14 is coupled with container assembly 12 to include a second axis of rotation including through corner aperture 14a2 and corner aperture 14a3 about aperture 12d6 and aperture 12b6, respectively. In implementations curvilinearly formed semi-rigid sheet assembly 14 is coupled with container assembly 12 to include an axis of translation including through corner aperture 14a1 and corner aperture 14a4 about curvilinear slot 12d2 and curvilinear slot 12b2.

Depicted implementation of curvilinearly formed semi-rigid sheet assembly 14 is further shown to include member 14b1, member 14b2, member 14b3, and member 14b4. Depicted implementation of curvilinearly formed semi-rigid sheet assembly 14 is further shown to include side 14c1, side 14c2, side 14c3, and side 14c4. Depicted implementation of curvilinearly formed semi-rigid sheet assembly 14 is further shown to include rear upper surface portion 14d1, and front upper surface portion 14d2.

Depicted implementation of side assembly 16 is shown to include semi-rigid member 16a, spring 16b, corner aperture 14a3, and coupler assembly 16c. Depicted implementation of semi-rigid member 16a is shown to include coupler 16a1 (e.g., threaded member such as screw or bolt), edge 16a2, angled portion 16a3, coupling portion 16a4, aperture 16a5, aperture 16a6, and aperture 16a7. Depicted implementation of spring 16b is shown to include coil body 16b1, end 16b2, and end 16b3. Depicted implementation of coupler assembly 16c is shown to include coupler 16c1 with head 16c1a, pin portion 16c1b, and coupler portion 16c1c. Depicted implementation of coupler assembly 16c is further shown to include coupler 16c2 with head 16c2a, pin portion 16c2b, and coupler portion 16c2c.

Depicted implementation of side assembly 18 is shown to include semi-rigid member 18a, semi-rigid member 18a, and coupler assembly 18c. Depicted implementation of semi-rigid member 18a is shown to include coupler 18a1 (e.g. threaded member such as screw, bolt, etc.), edge 18a2, angled portion 18a3, coupling portion 18a4, aperture 18a5, and aperture 18a6, and aperture 18a7. Depicted implementation of spring 18b is shown to include spring 18b with coil body 18b1, end 18b2, and end 18b3. Depicted implementation of coupler assembly 18c is shown to include coupler 18c1, with head 18c1a, pin portion 18c1b, and coupler portion 18c1c, and shown to include coupler 18c2 with head 18c2a, pin portion 18c2b, and coupler portion 18c2c.

Figure 2:
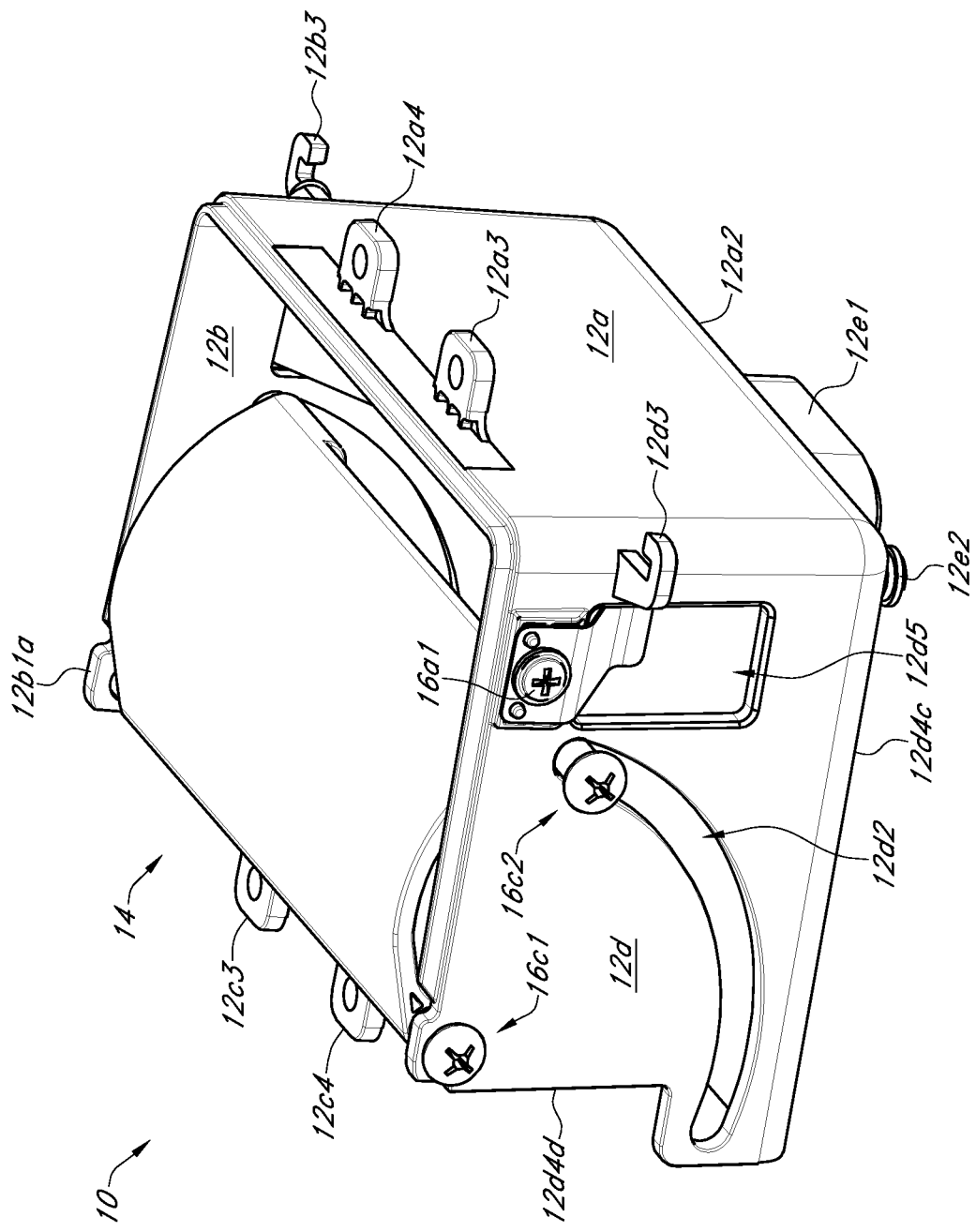
FIG. 2 is a left top front perspective view of the holder of FIG. 1.

Turning to FIG. 2, depicted therein is a left top front perspective view of holder assembly 10. Depicted implementation of base portion 12e of container assembly 12 is shown to include device interface front 12e2. As depicted, side portion 12a is shown opposingly spaced from curvilinearly formed semi-rigid sheet assembly 14.

Figure 3:
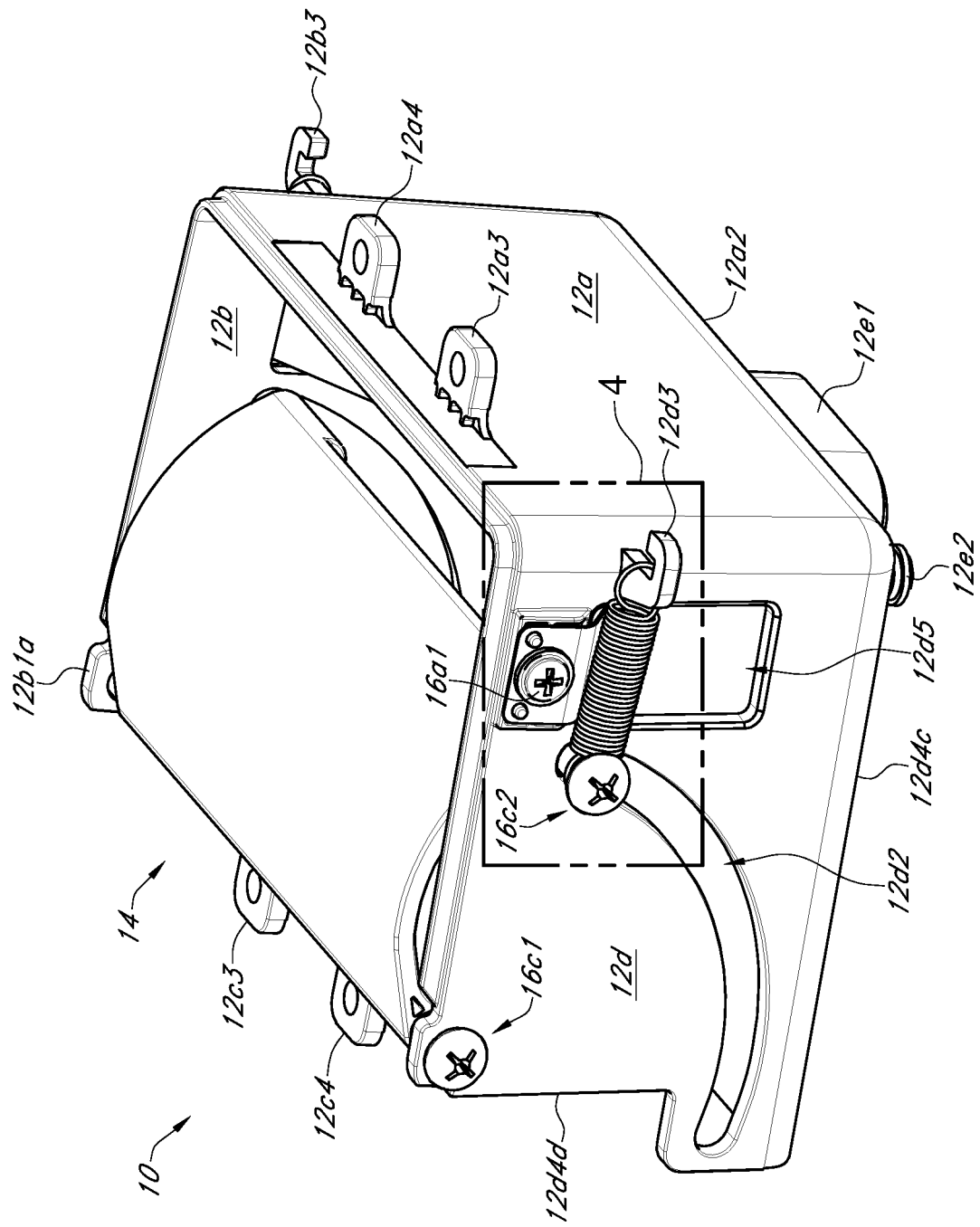
FIG. 3 is a left top front perspective view of the holder of FIG. 1 with spring.

Turning to FIG. 3, depicted therein is a left top front perspective view of holder assembly 10 including spring 16b.

Figure 4:
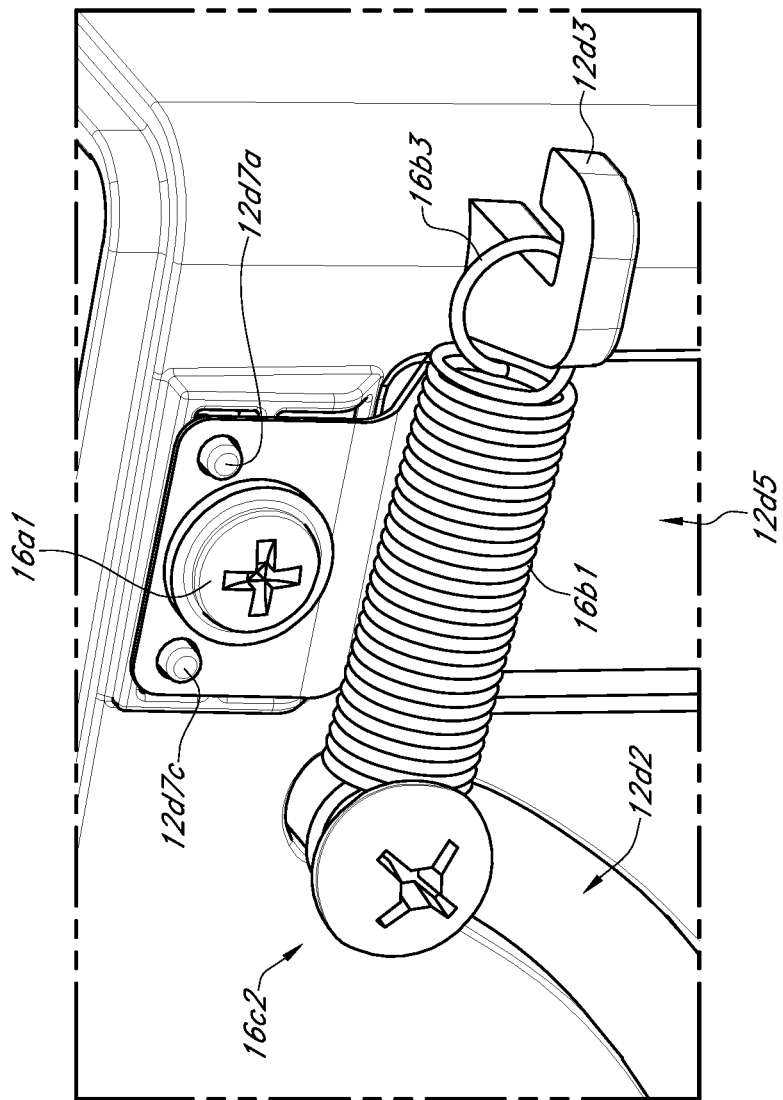
FIG. 4 is an enlarged view of a portion of the holder of FIG. 1 taken along the dashed rectangle labeled "4" of FIG. 3.

Turning to FIG. 4, depicted therein is an enlarged view of a portion of holder assembly 10 taken along the dashed rectangle labeled "4" of FIG. 3.

Figure 5:
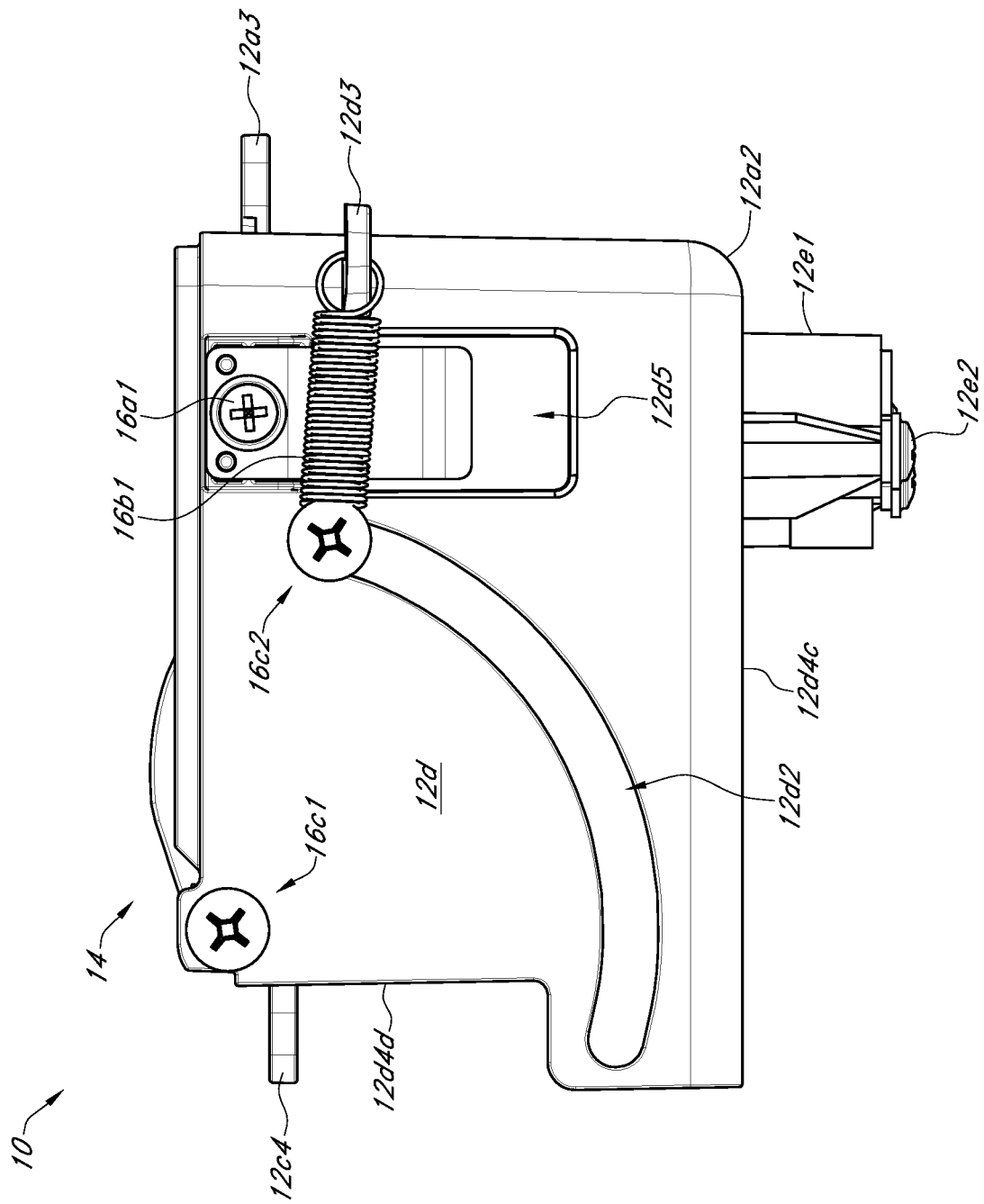
FIG. 5 is a side elevational view of the holder of FIG. 1.

Turning to FIG. 5, depicted therein is a side elevational view of holder assembly 10. As shown, protrusion 12a3 and protrusion 12a4 have an elevation value greater than protrusion 12c3 and protrusion 12c4 by at least the thickness of protrusion 12a3 and protrusion 12a4. In implementations the bottom surfaces of protrusion 12a3 and protrusion 12a4 have an elevation value greater than the top surfaces of protrusion 12c3 and protrusion 12c4.

Figure 6:
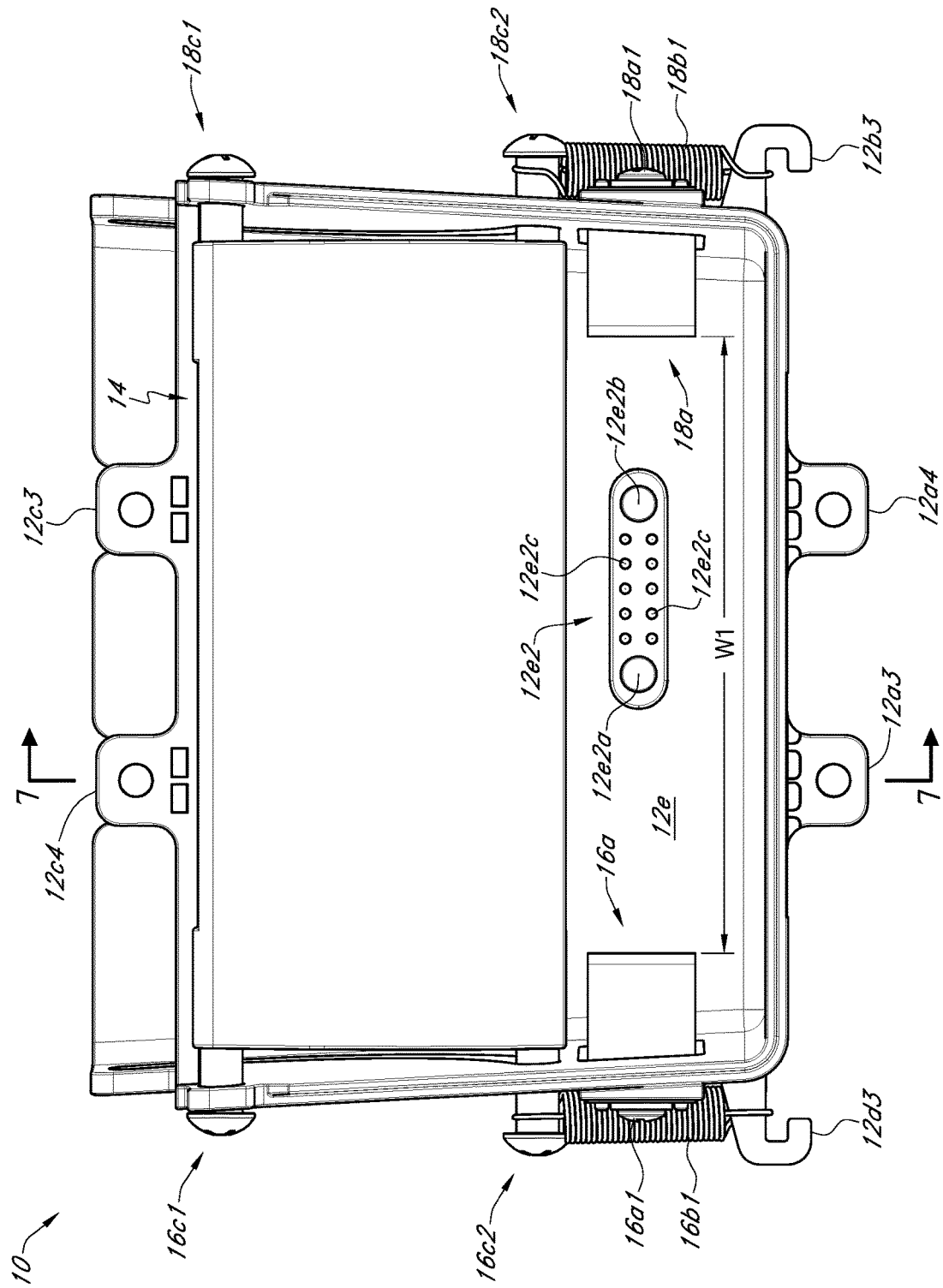
FIG. 6 is a top plan view of the holder of FIG. 1.

Turning to FIG. 6, depicted therein is a top plan view of holder assembly 10. Depicted implementation of holder assembly 10 is shown to include width dimension W1 between semi-rigid member 16a and semi-rigid member 18a which changes as semi-rigid member 16a and semi-rigid member 18a adjust to accommodate with a device being held. Depicted implementation of device interface front 12e2 of base portion 12e of container assembly 12 is shown to include contact 12e2a, contact 12e2b, and contact 12e2c. In implementations the center of aperture 12a3a of protrusion 12a3 is similarly distanced from side portion 12a as the center of aperture 12a4a of protrusion 12a4, which applies similarly to the pair of protrusion 12c3 and protrusion 12c4 with respect to distancing from side portion 12c. In implementations distancing between aperture centers of protrusion 12a3 and protrusion 12a4 are similar or equal to distancing between aperture centers of protrusion 12c3 and protrusion 12c4.

Figure 7:
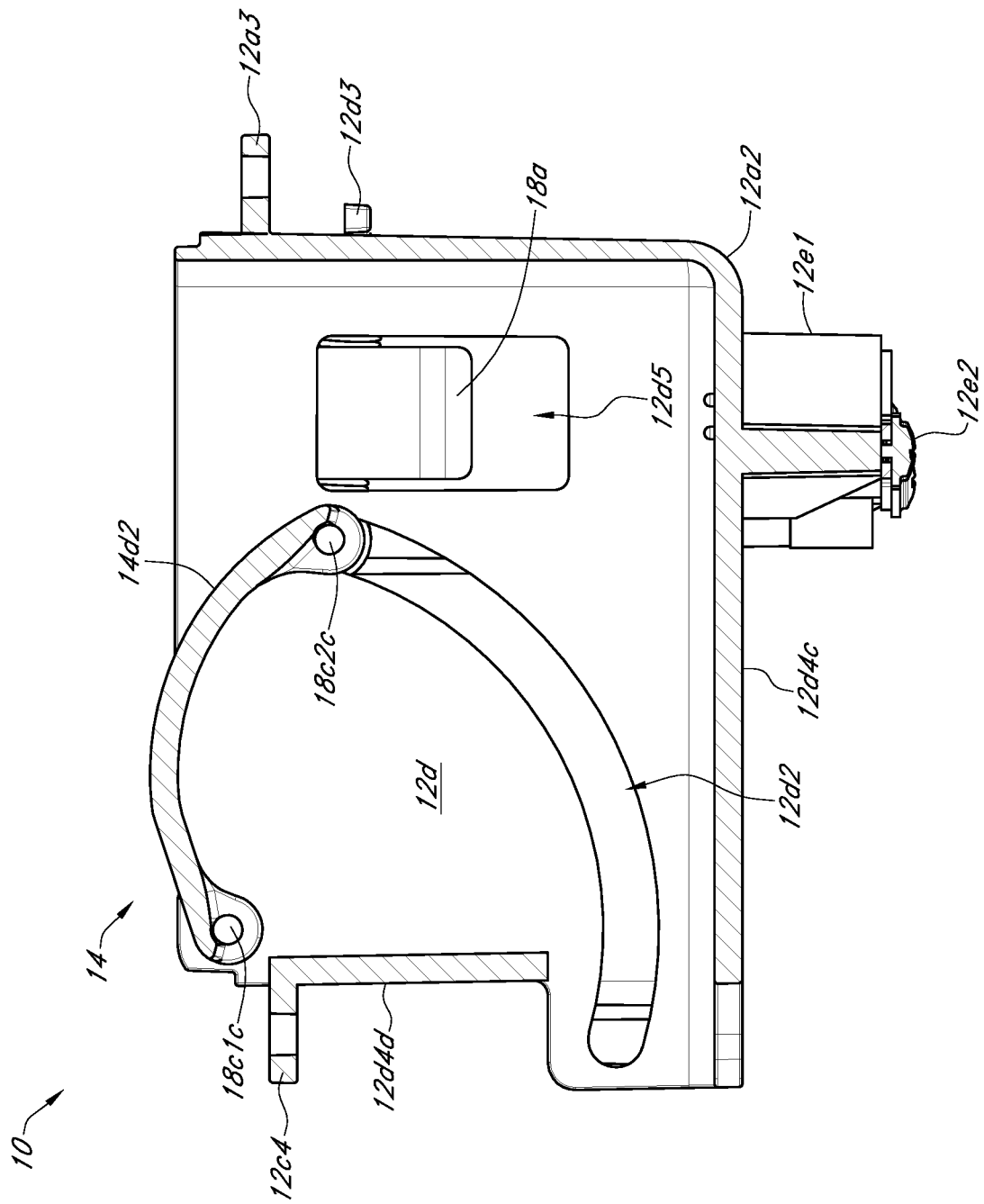
FIG. 7 is a side-elevational cross-sectional view of FIG. 1 taken along the 7-7 cutline of FIG. 6.

Turning to FIG. 7, depicted therein is a side-elevational cross-sectional view of holder assembly 10 taken along the 7-7 of FIG. 6. As shown, base portion 12e includes a portion that extends past the plane that occupies side portion 12c and also past how far the center of aperture 12c4a of protrusion 12c4 extends from side portion 12c.

Figure 8:
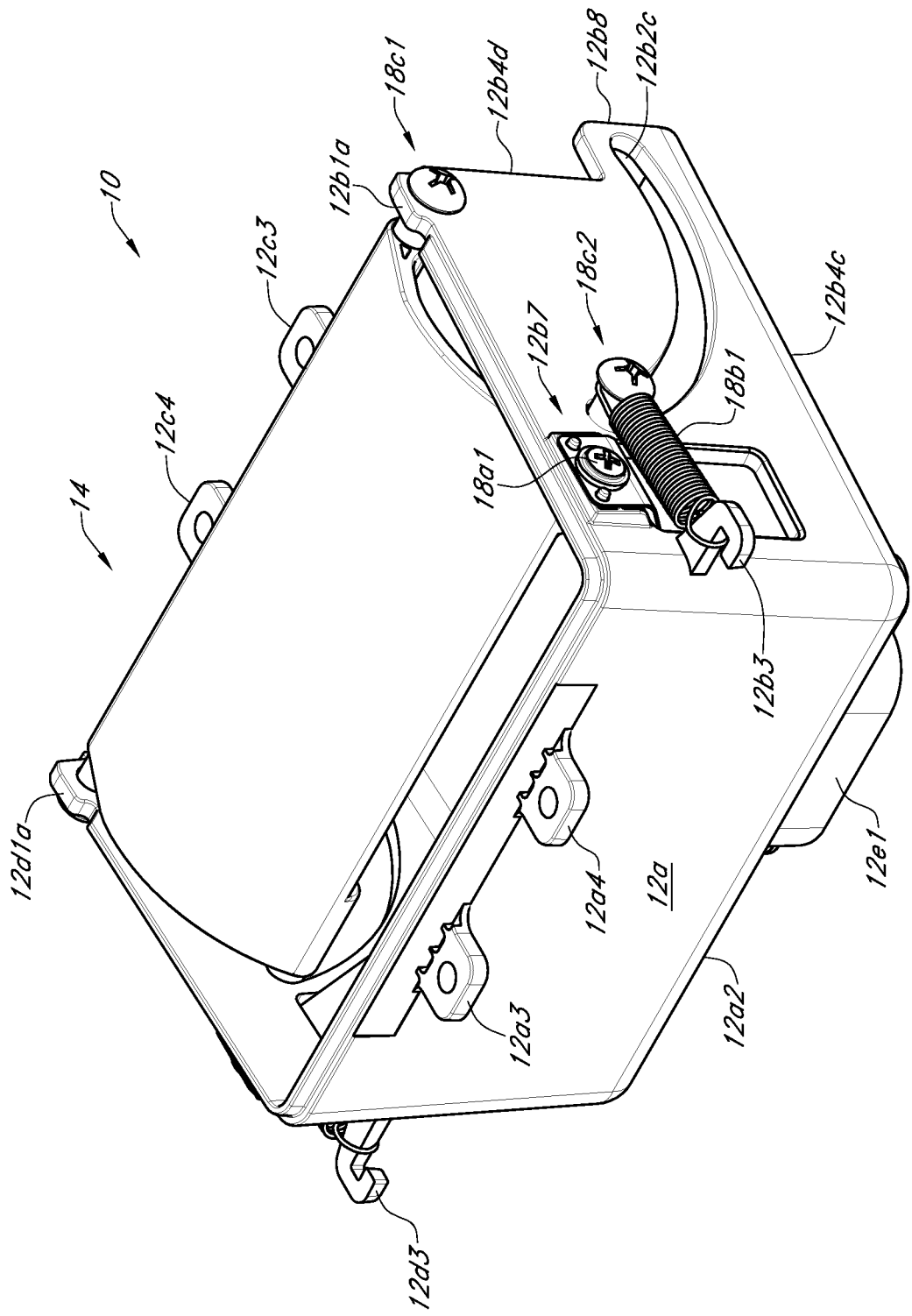
FIG. 8 is a right top front perspective view of the holder of FIG. 1.

Turning to FIG. 8, depicted therein is a right top front perspective view of holder assembly 10. Depicted implementation of curvilinear slot 12b2 of side portion 12b of container assembly 12 is shown to include end portion 12b2c. Depicted implementation of side portion 12b of container assembly 12 is shown to include edge 12b4c and edge 12b4d. Depicted implementation of side portion 12b of container assembly 12 is shown to include coupler 12b7, and protrusion 12b8.

Figure 9:
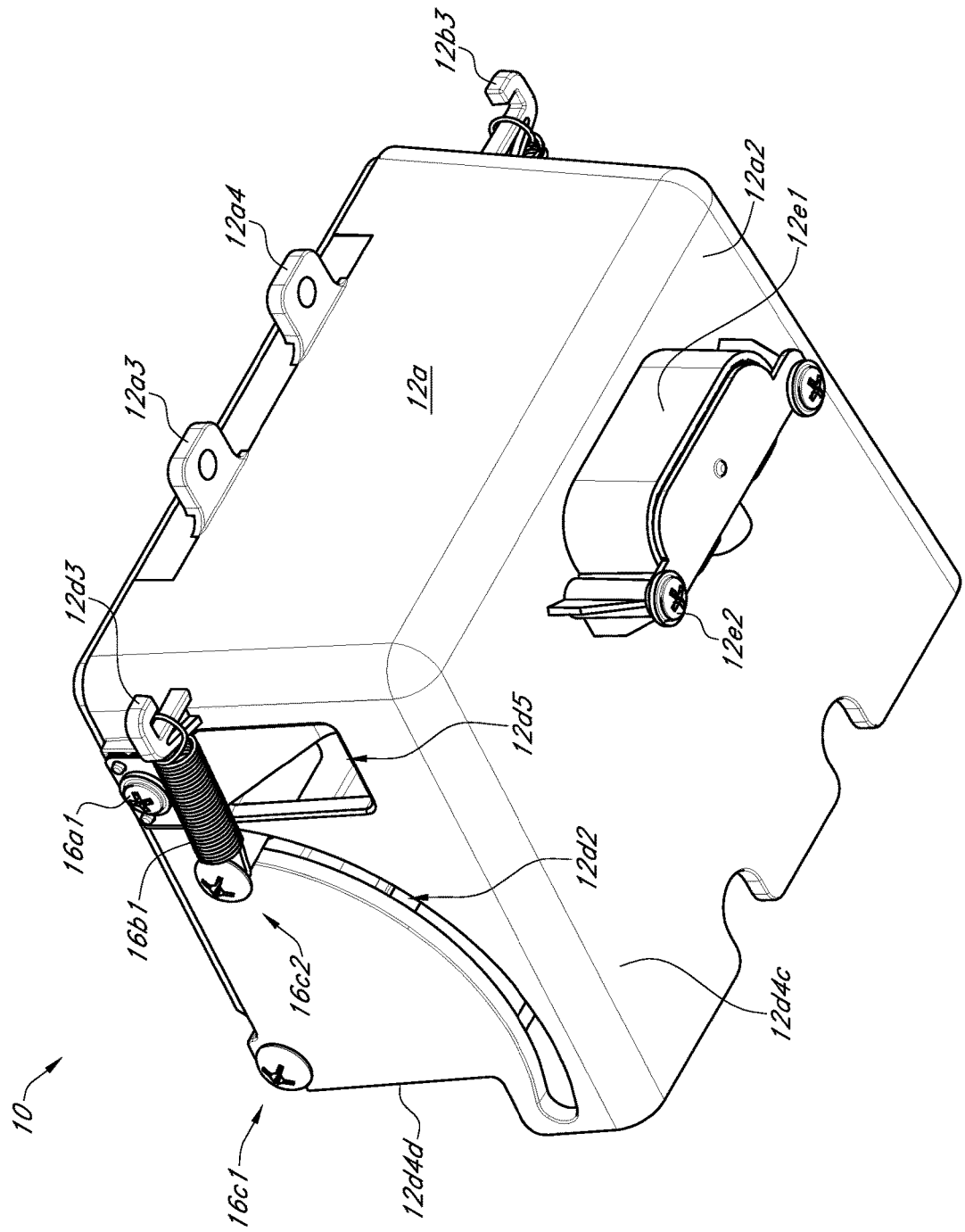
FIG. 9 is a left bottom front perspective view of the holder of FIG. 1.

Turning to FIG. 9, depicted therein is a left bottom front perspective view of holder assembly 10.

Figure 10:
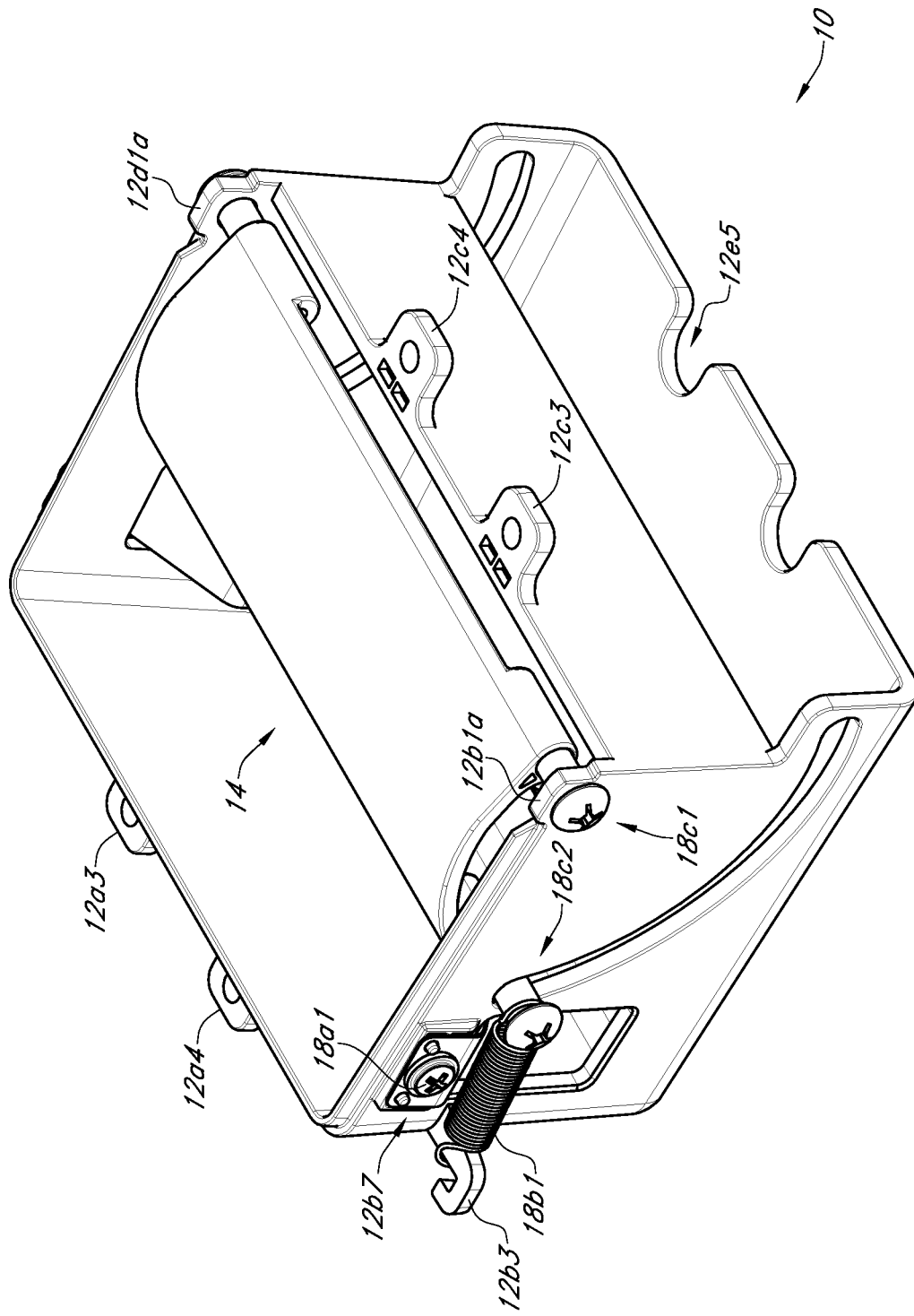
FIG. 10 is a right top rear perspective view of the holder of FIG. 1.

Turning to FIG. 10, depicted therein is a right top rear perspective view of holder assembly 10. Depicted implementation of base portion 12e of container assembly 12 is shown to include notch 12e5. As depicted in implementations, a portion of notch 12e5 is in vertical alignment (when base portion 12e is horizontally oriented) with the center of aperture 12c4a of protrusion 12c4.

Figure 11:
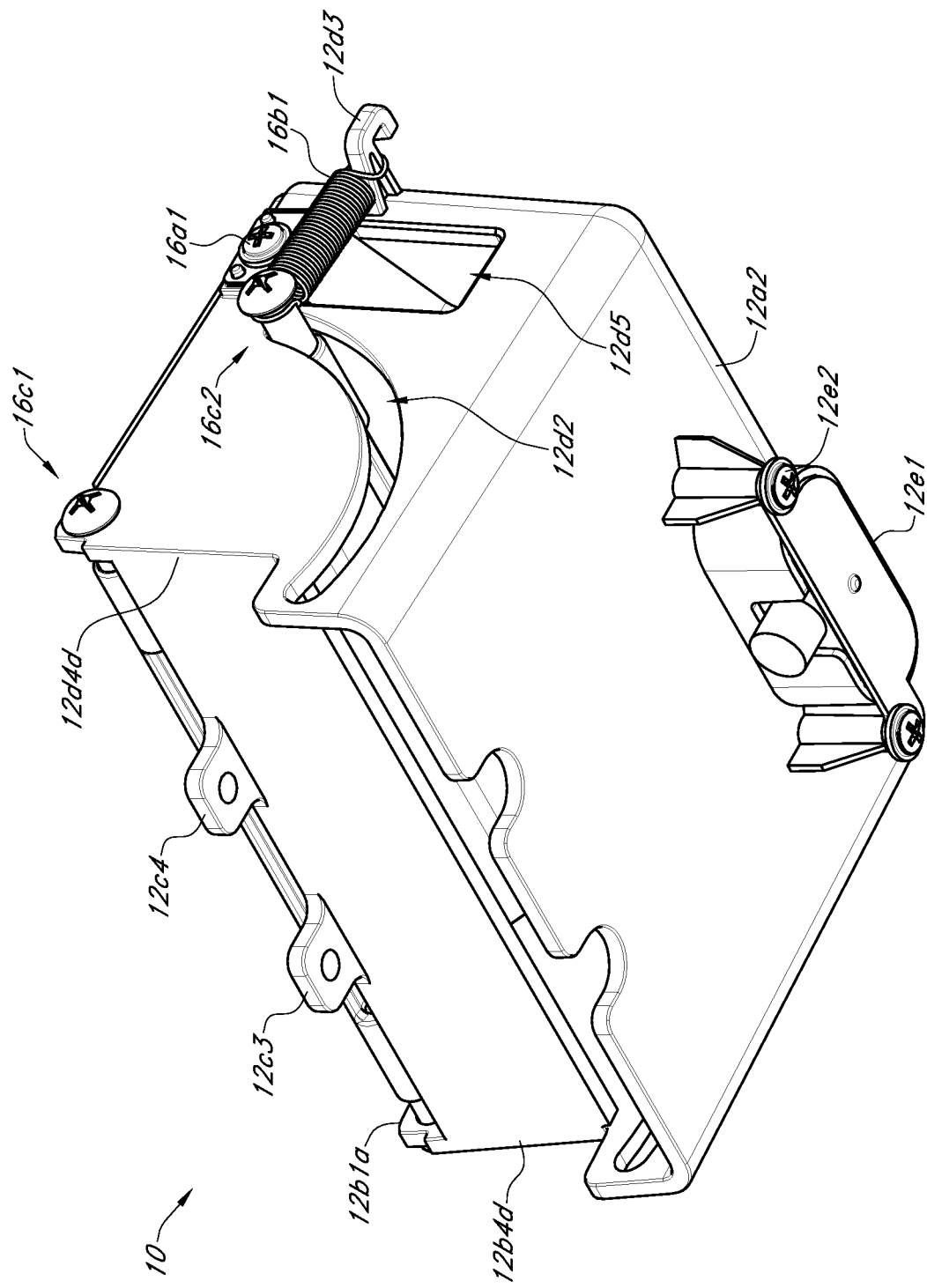
FIG. 11 is a left bottom rear perspective view of the holder of FIG. 1.

Turning to FIG. 11, depicted therein is a left bottom rear perspective view of holder assembly 10.

Figure 12:
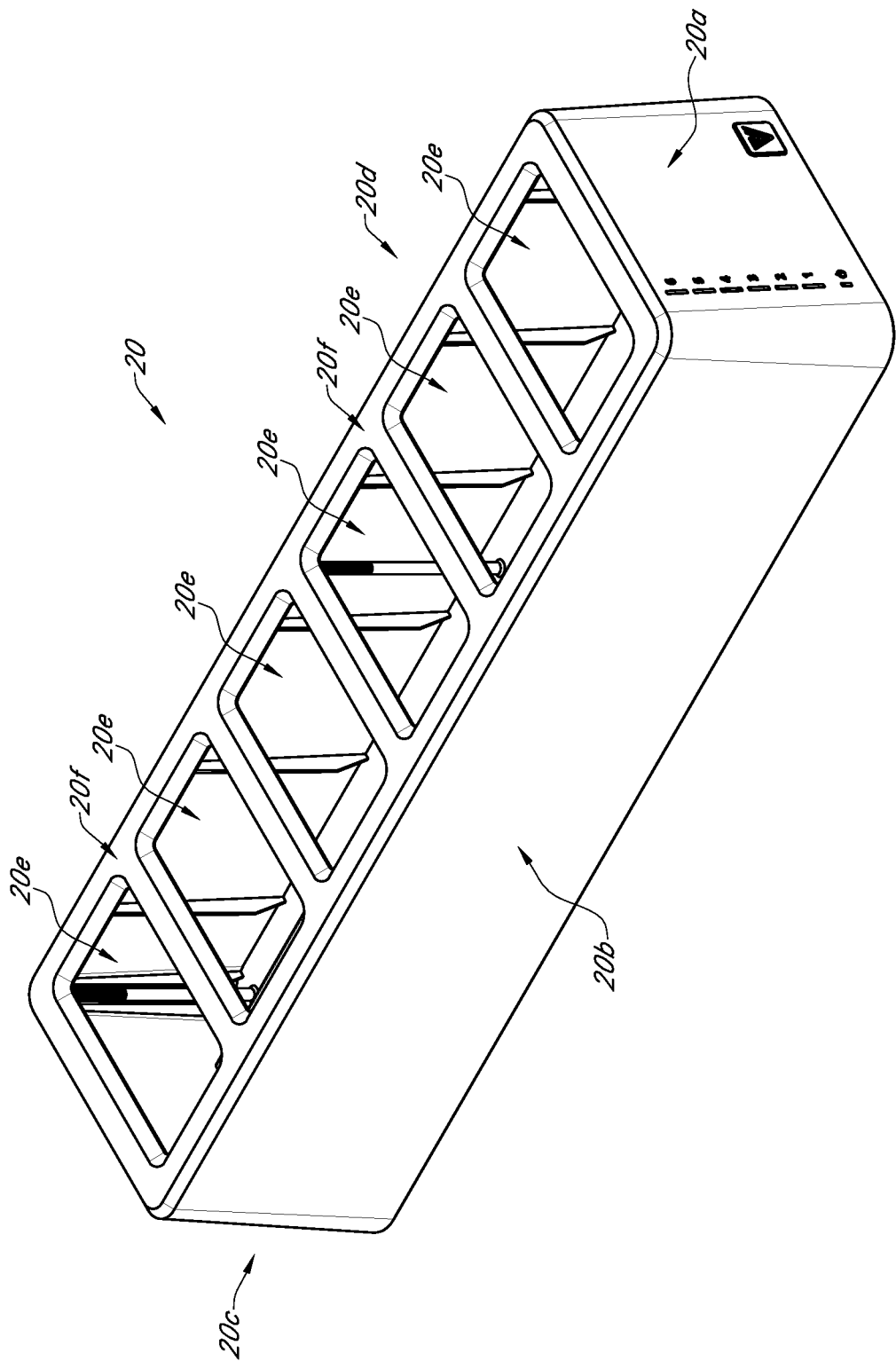
FIG. 12 is a left top front perspective view of a charging station case.

Turning to FIG. 12, depicted therein is a left top front perspective view of housing 20. Depicted implementation of housing 20 is shown to include side 20a, side 20b, side 20c, side 20d, aperture 20e, and upper surface 20f.

Figure 13:
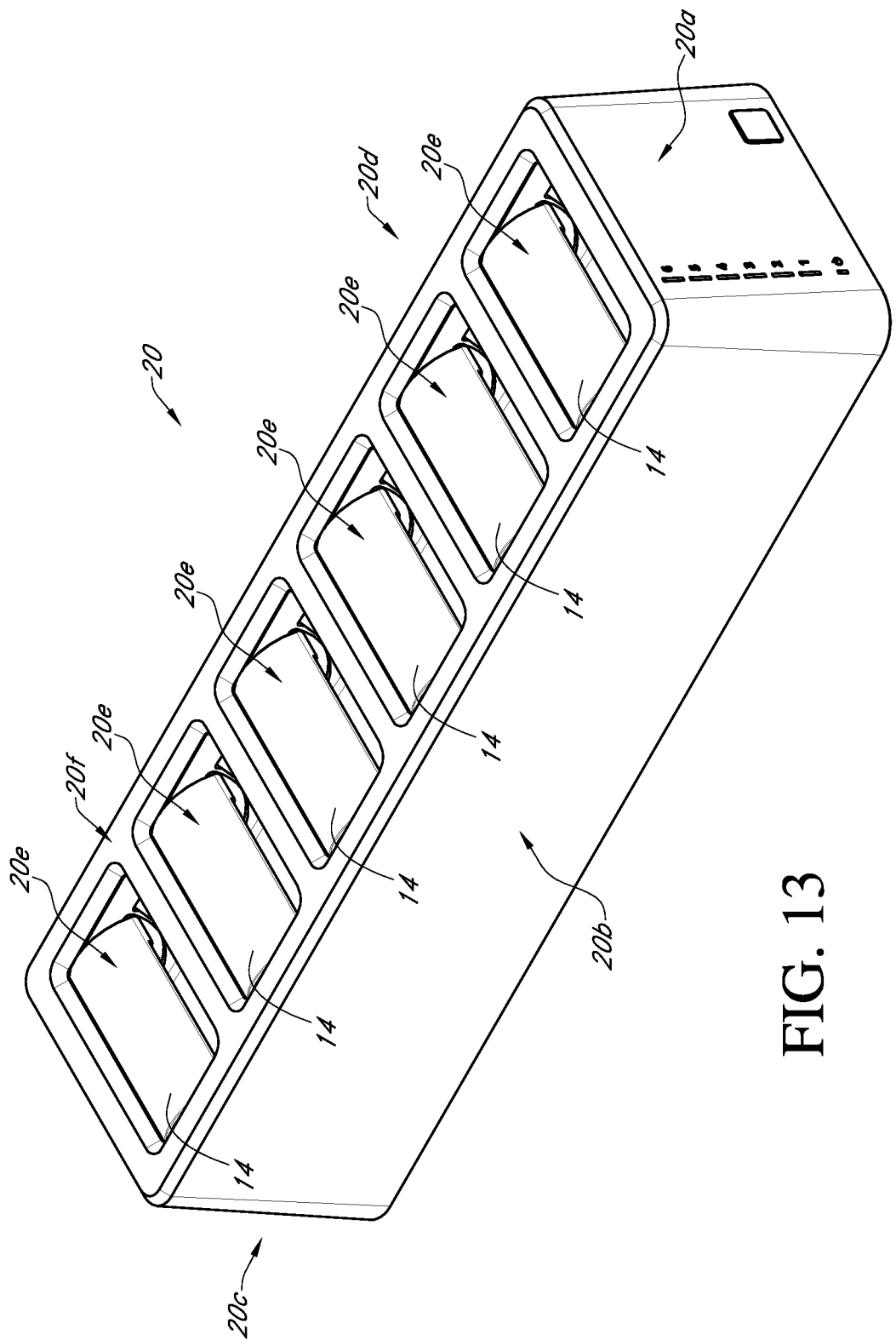
FIG. 13 is a left top front perspective view of the charging station case of FIG. 12 containing a plurality of the holders of FIG. 1 with the plurality of holders each including an adjustable back in a first position.

Turning to FIG. 13, depicted therein is a left top front perspective view of housing 20 containing a plurality of holder assembly 10 with the plurality of holder assembly 10 each including curvilinearly formed semi-rigid sheet assembly 14 in a first position.

Figure 14:
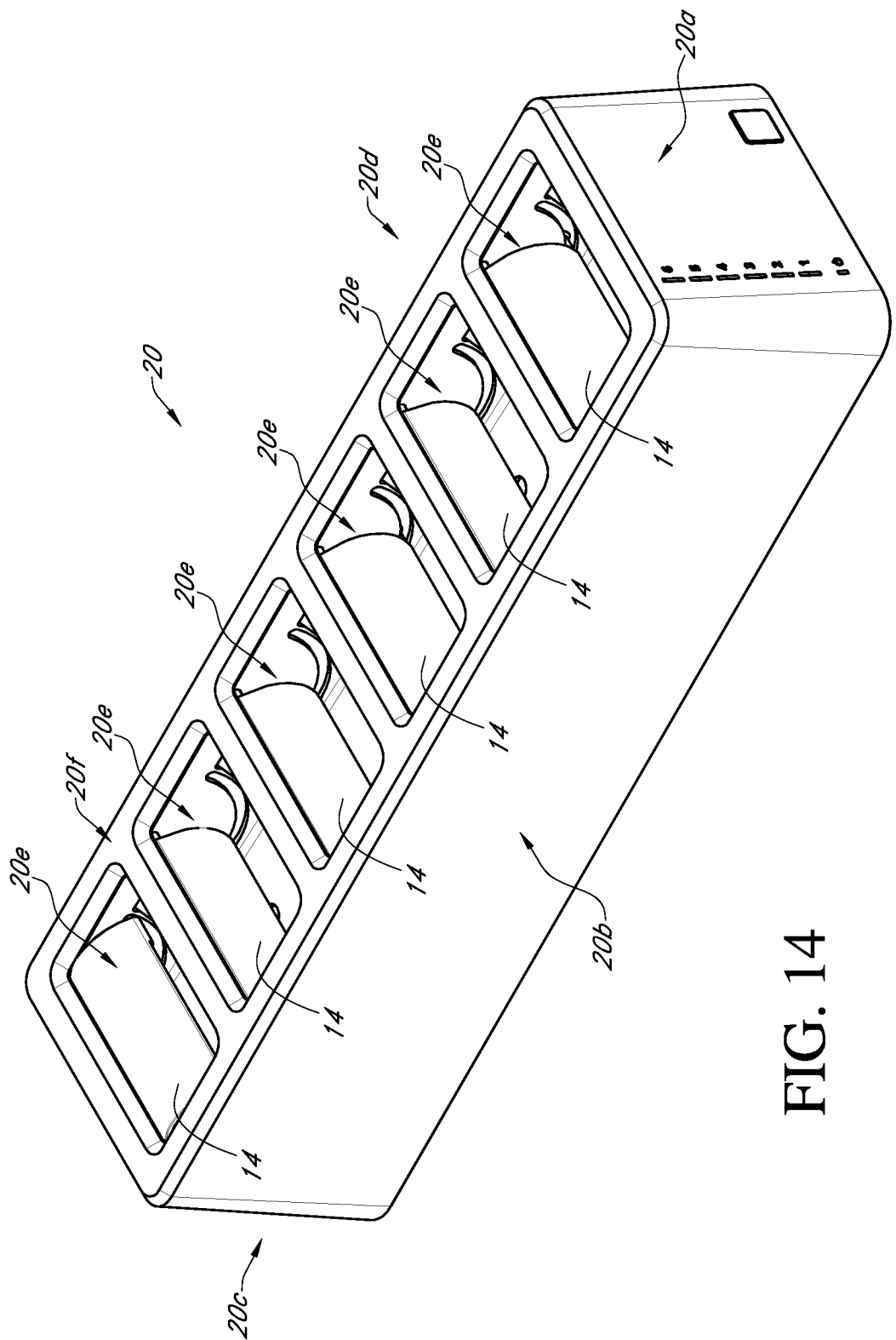
FIG. 14 is a left top front perspective view of the charging station of FIG. 12 containing the plurality of the holders of FIG. 13 with one of the plurality of holders including its adjustable back in the first position of FIG. 13 and other of the plurality of holders with their adjustable backs in other positions.

Turning to FIG. 14, depicted therein is a left top front perspective view of housing 20 containing a plurality of holder assembly 10 with the plurality of holder assembly 10 one including one curvilinearly formed semi-rigid sheet assembly 14 in the first position of FIG. 13 and other curvilinearly formed semi-rigid sheet assembly 14 in a various other positions.

Figure 15A:
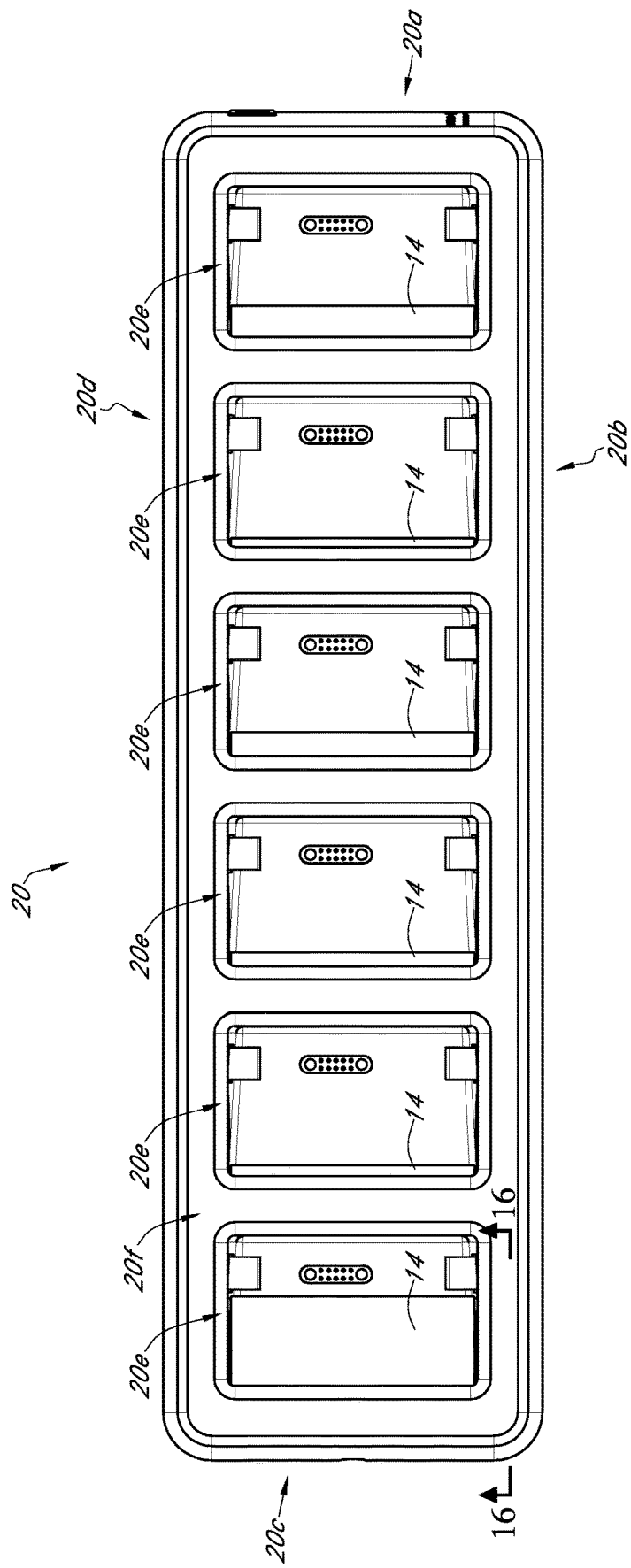
FIG. 15A is a top plan view of the charging station of FIG. 12 containing a plurality of the holders of FIG. 13 with the plurality of the holders with their adjustable backs in the various positions of FIG. 14.

Turning to FIG. 15A, depicted therein is a top plan view of housing 20 containing a plurality of holder assembly 10 with curvilinearly formed semi-rigid sheet assembly 14 in the various positions.

Figure 15B:
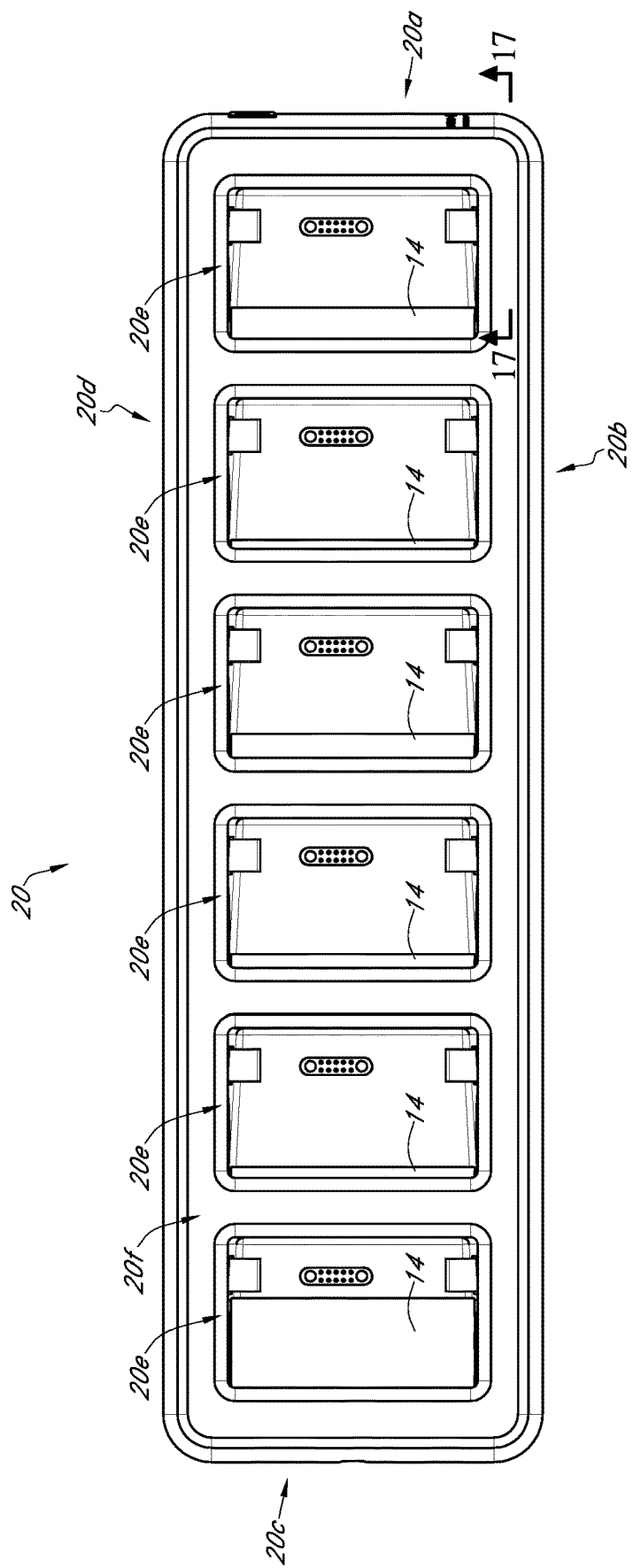
FIG. 15B is a top plan view of the charging station of FIG. 12 containing a plurality of the holders of FIG. 13 with the plurality of the holders with their adjustable backs in the various positions of FIG. 14.

Turning to FIG. 15B, depicted therein is a top plan view of housing 20 containing a plurality of holder assembly 10 with curvilinearly formed semi-rigid sheet assembly 14 in the various positions.

Figure 15C:
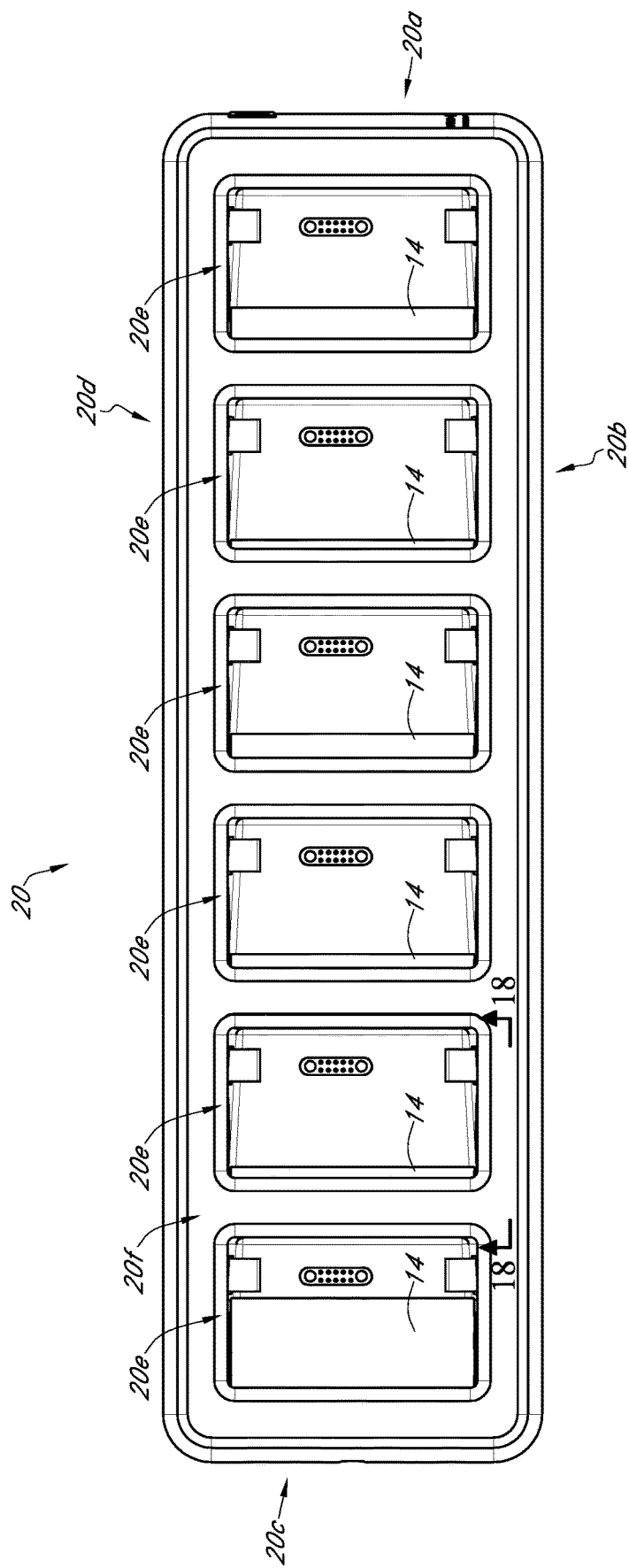
FIG. 15C is a top plan view of the charging station of FIG. 12 containing a plurality of the holders of FIG. 13 with the plurality of the holders with their adjustable backs in the various positions of FIG. 14.

Turning to FIG. 15C, depicted therein is a top plan view of housing 20 containing a plurality of holder assembly 10 with curvilinearly formed semi-rigid sheet assembly 14 in the various positions.

Figure 16:
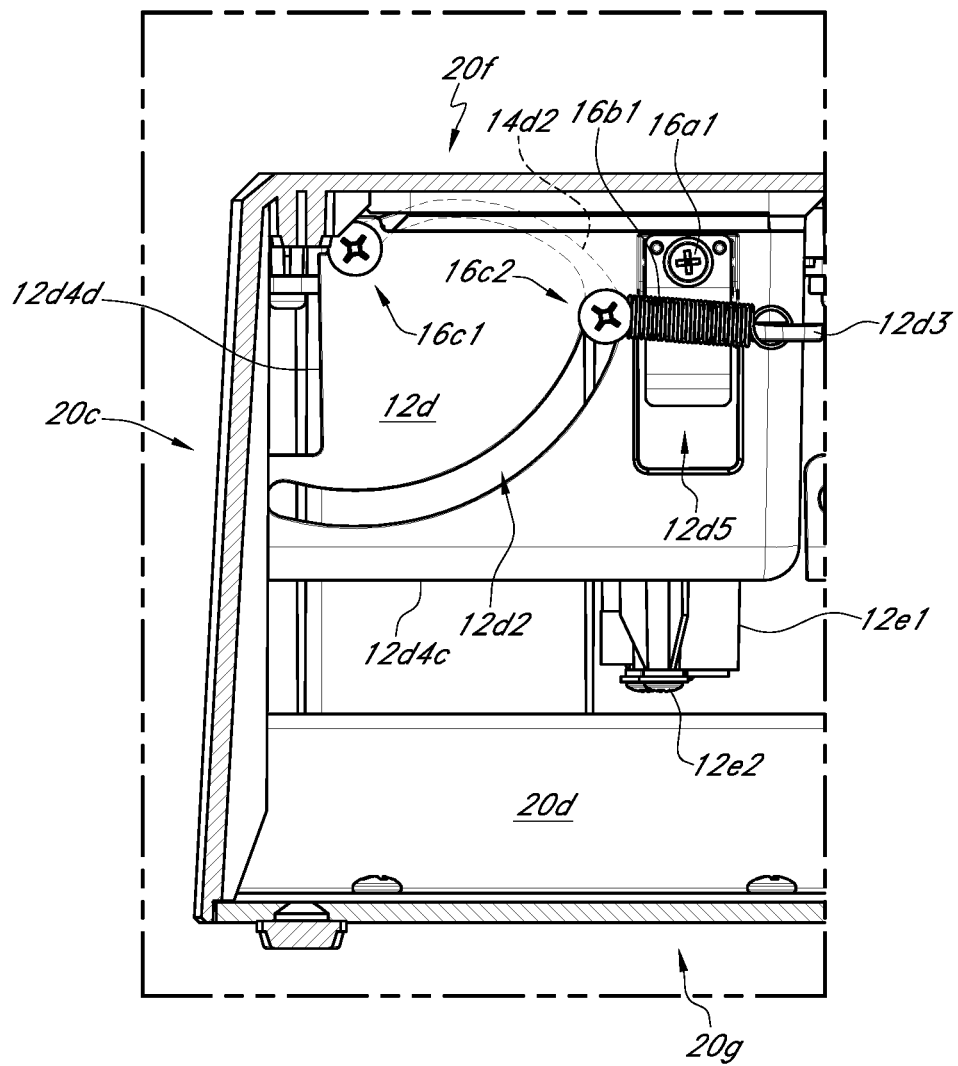
FIG. 16 is a side elevational cross-sectional view of a rear portion of the charging station with adjustable holder back in the first position of FIG. 13 taken along the 16-16 cutline of FIG. 15A.

Turning to FIG. 16, depicted therein is a side elevational cross-sectional view of a rear portion of housing 20 with curvilinearly formed semi-rigid sheet assembly 14 in the first position of FIG. 13 taken along the 16-16 cutline of FIG. 15A. Depicted implementation of housing 20 is shown to include base portion 20g.

Figure 17:
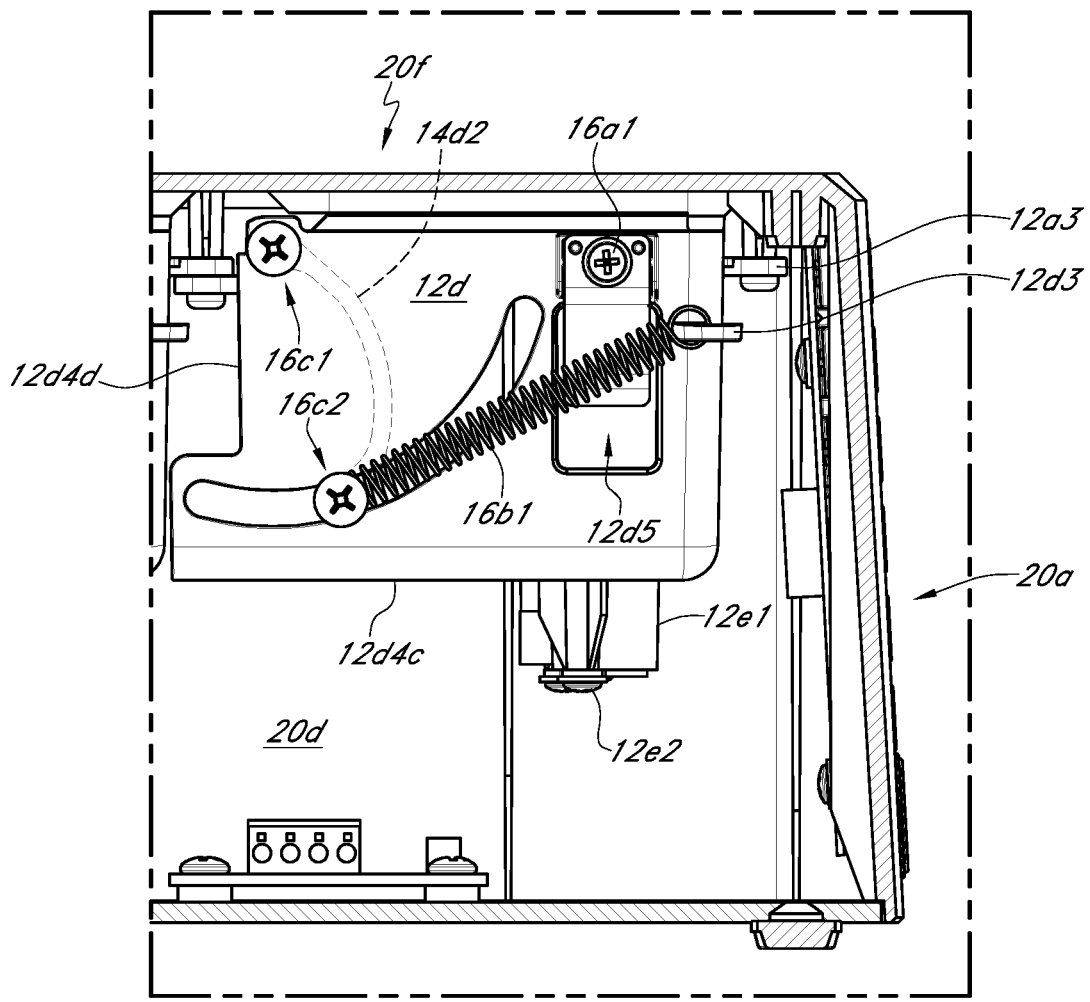
FIG. 17 is a side elevational cross-sectional view of a front portion of the charging station with adjustable holder back in a second position taken along the 17-17 cutline of FIG. 15B.

Turning to FIG. 17, depicted therein is a side elevational cross-sectional view of a front portion of housing 20 with curvilinearly formed semi-rigid sheet assembly 14 in a second position taken along the 17-17 cutline of FIG. 15B.

Figure 18:
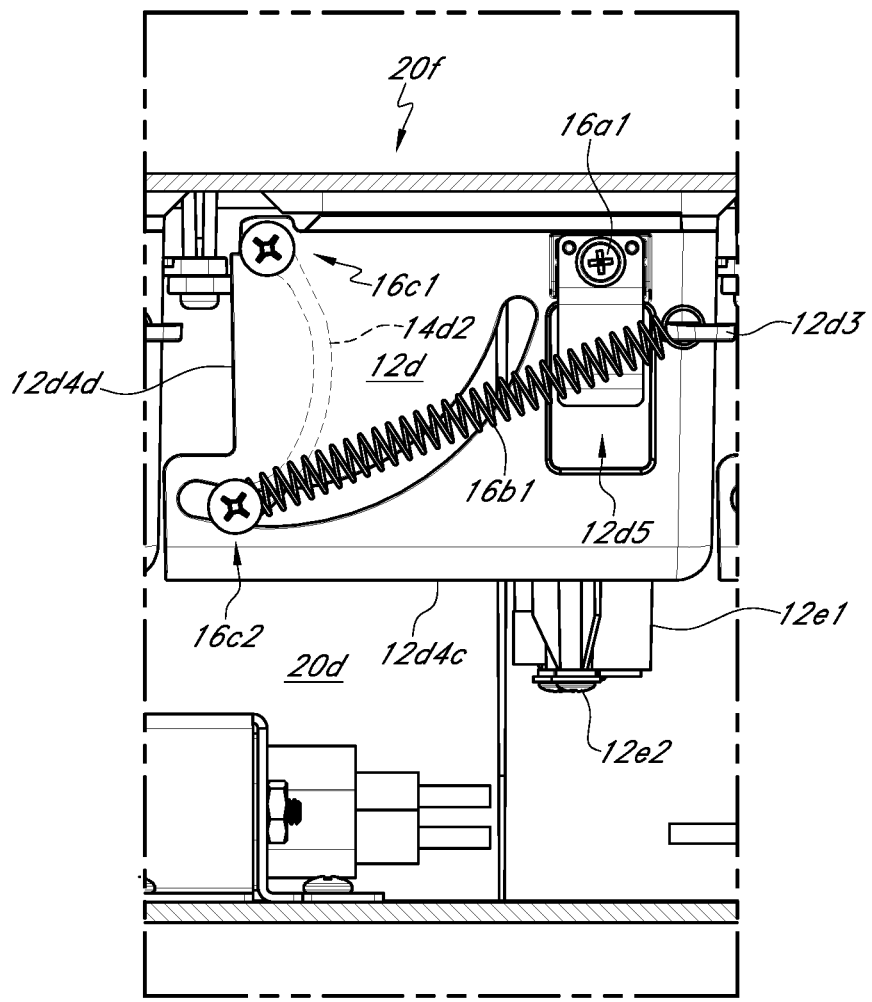
FIG. 18 is a side elevational cross-sectional view of a mid portion of the charging station with adjustable holder back in a third position taken along the 18-18 cutline of FIG. 15C.

Turning to FIG. 18, depicted therein is a side elevational cross-sectional view of a mid portion of housing 20 with curvilinearly formed semi-rigid sheet assembly 14 in a third position taken along the 18-18 cutline of FIG. 15C. As shown in FIGS. 16-18, different portions of curvilinearly formed semi-rigid sheet assembly 14 are closest to side portion 12a as the closest distance from curvilinearly formed semi-rigid sheet assembly 14 to side portion 12a change.

Figure 19:
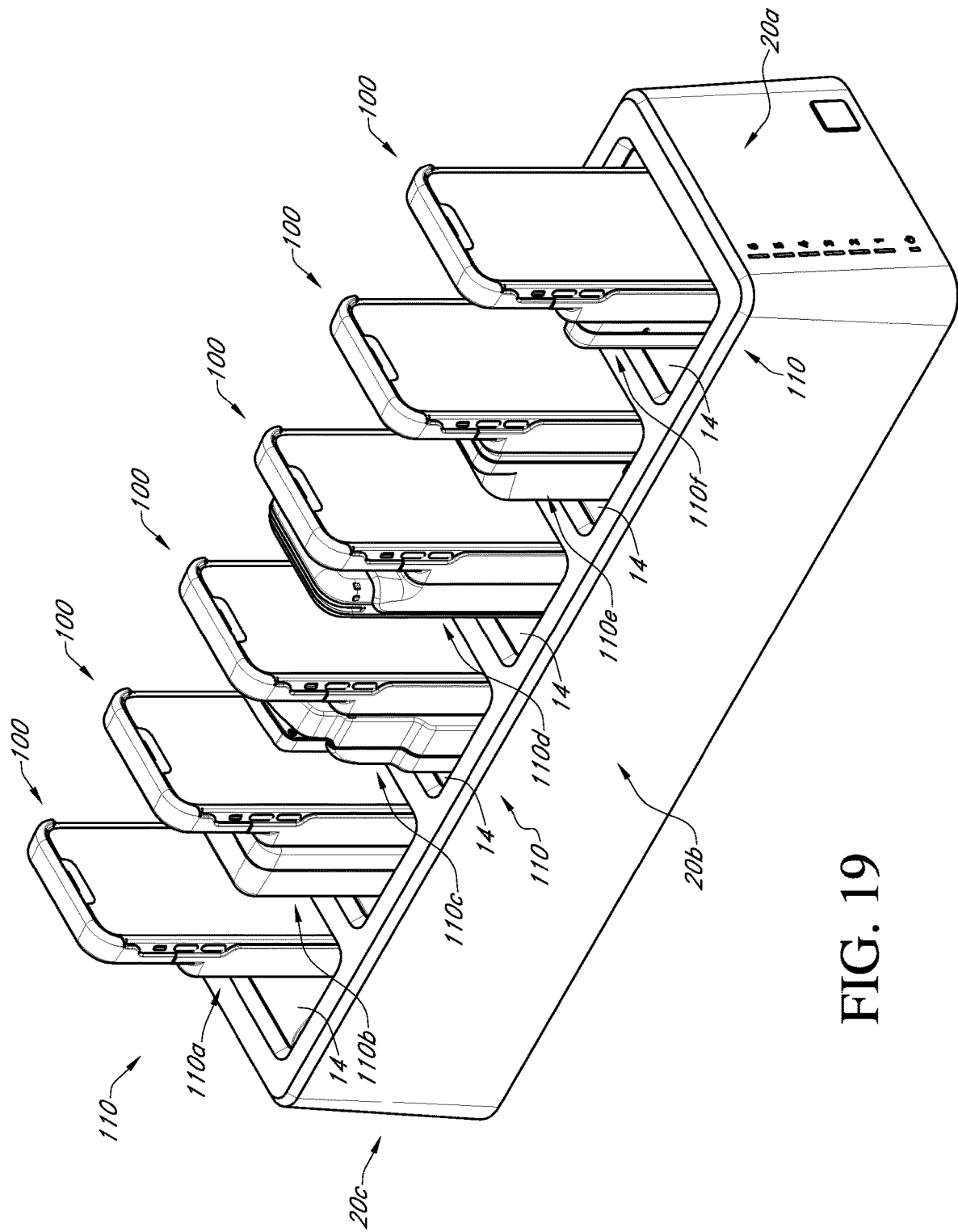
FIG. 19 is a left top front perspective the charging station coupled with a plurality of portable electronic devices with accessory backs of various thicknesses.

Turning to FIG. 19, depicted therein is a left top front perspective of housing 20 being coupled with a plurality of device 100, each being coupled with device backs 110 of various thicknesses.

Depicted implementations of device backs 110 are shown to include device back 110a, device back 110b, device back 110c, device back 110d, device back 110e, and device back 110f. Consequently, various curvilinearly formed semi-rigid sheet assembly 14 of holder assembly 10 coupled in housing 20 are depicted as positioned accordingly to which version of device 100 coupled with a particular device backs 110 of particular dimension.

Figure 20A:
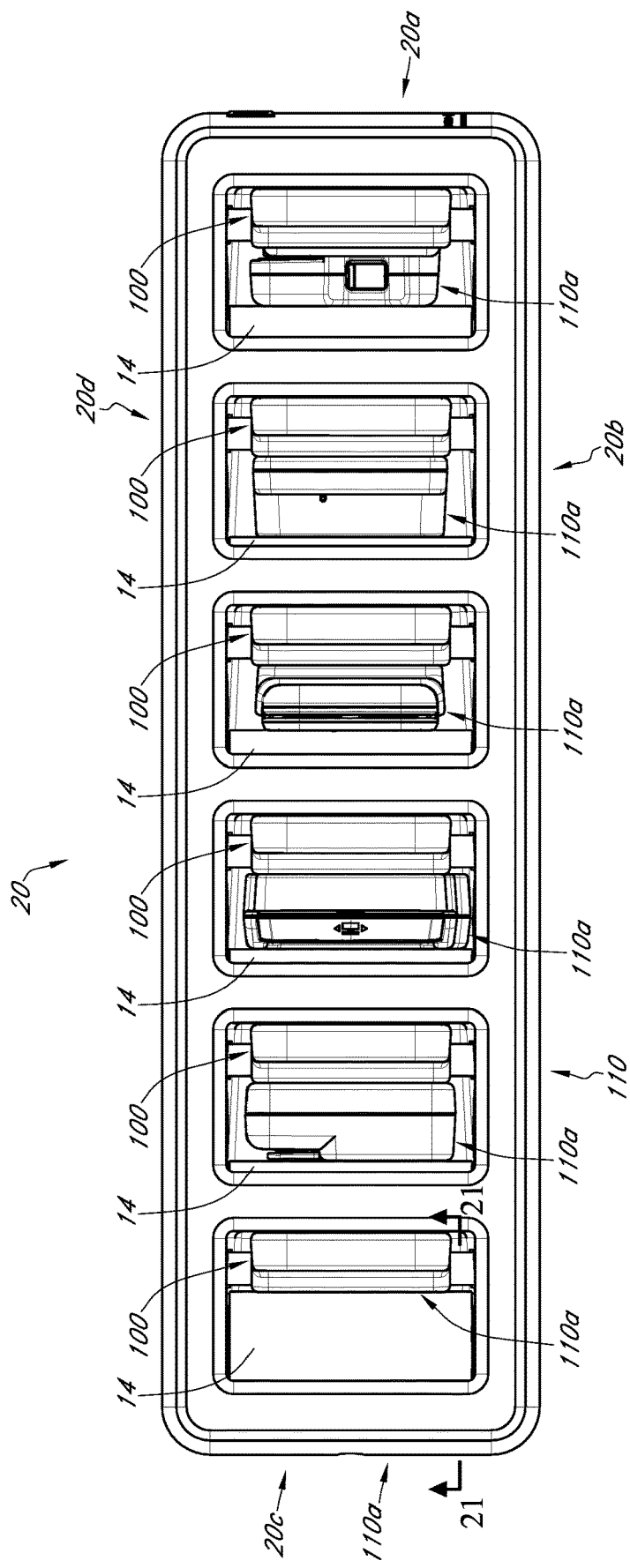
FIG. 20A is a top plan view of the charging station of FIG. 12 containing a plurality of the holders of FIG. 13 with the plurality of the holders with their adjustable backs in the various positions of FIG. 14 to accommodate particular ones of the plurality of portable electronic devices coupled with accessory backs of various thicknesses.

Turning to FIG. 20A, depicted therein is a top plan view of housing 20 being coupled with a plurality of device 100, each being coupled with device backs 110 of various thicknesses.

Figure 20B:
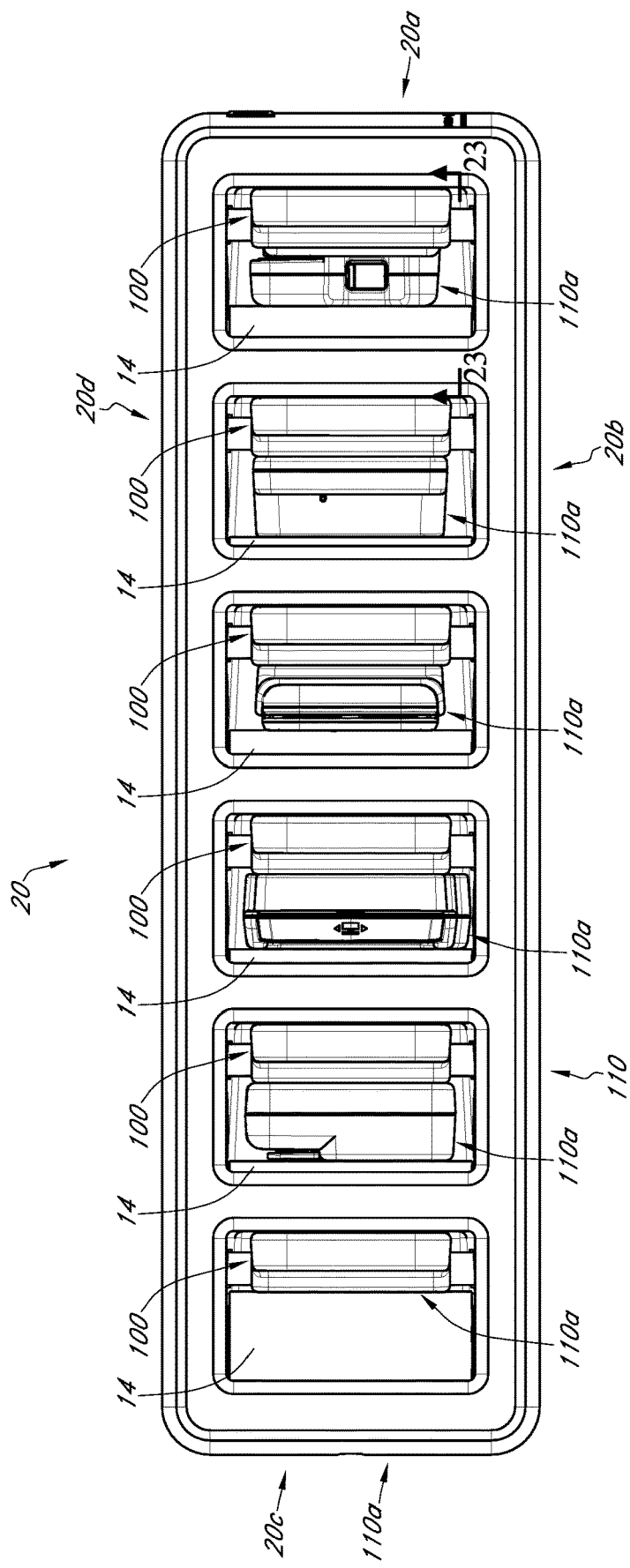
FIG. 20B is a top plan view of the charging station of FIG. 12 containing a plurality of the holders of FIG. 13 with the plurality of the holders with their adjustable backs in the various positions of FIG. 14 to accommodate particular ones of the plurality of portable electronic devices coupled with accessory backs of various thicknesses.

Turning to FIG. 20B, depicted therein is a top plan view of housing 20 being coupled with a plurality of device 100, each being coupled with device backs 110 of various thicknesses.

Figure 20C:
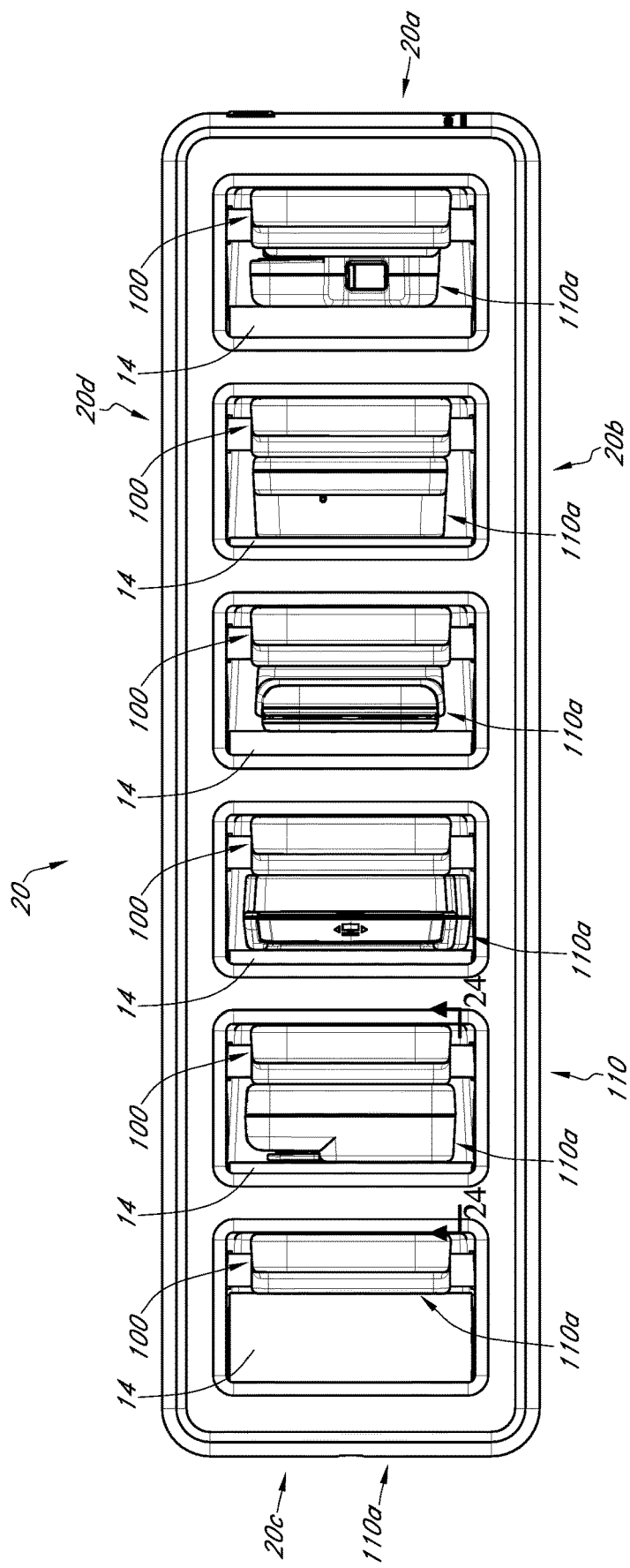
FIG. 20C is a top plan view of the charging station of FIG. 12 containing a plurality of the holders of FIG. 13 with the plurality of the holders with their adjustable backs in the various positions to accommodate particular ones of the plurality of portable electronic devices coupled with accessory backs of various thicknesses.

Turning to FIG. 20C, depicted therein is a top plan view of housing 20 being coupled with a plurality of device 100, each being coupled with device backs 110 of various thicknesses.

Figure 21:
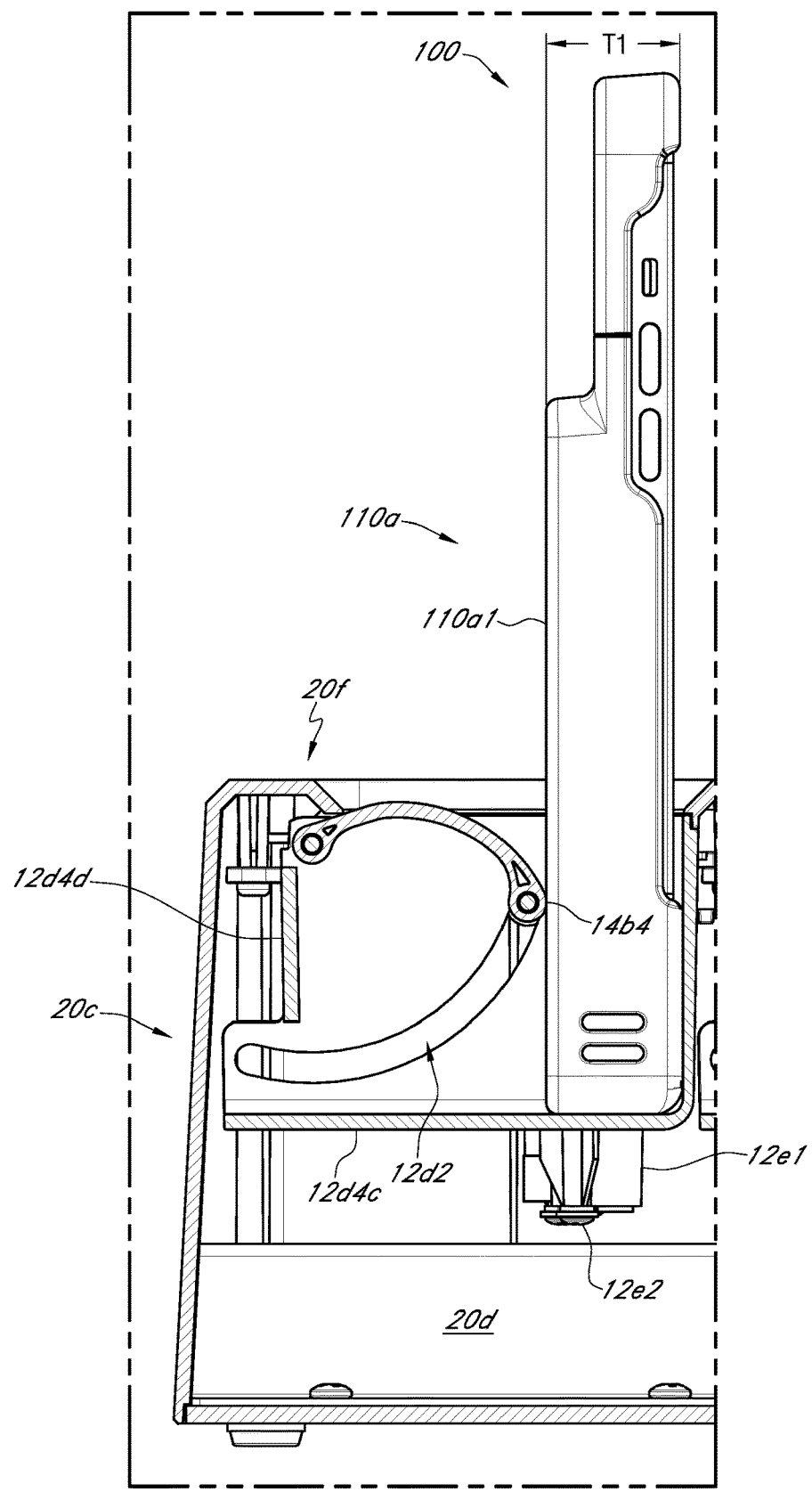
FIG. 21 is a side elevational cross-sectional view of a rear portion of the charging station with adjustable holder back in the first position of FIG. 13 to accommodate the thickness of one of the plurality portable electronic devices taken along the 21-21 cutline of FIG. 20A.

Turning to FIG. 21, depicted therein is a side elevational cross-sectional view of a rear portion of housing 20 with curvilinearly formed semi-rigid sheet assembly 14 of holder assembly 10 holding device back 110a including back surface 110a1 combined to have thickness dimension T1. Depicted implementation of curvilinearly formed semi-rigid sheet assembly 14 is shown in the first position of FIG. 13 accordingly taken along the 21-21 cutline of FIG. 20A.

Figure 22:
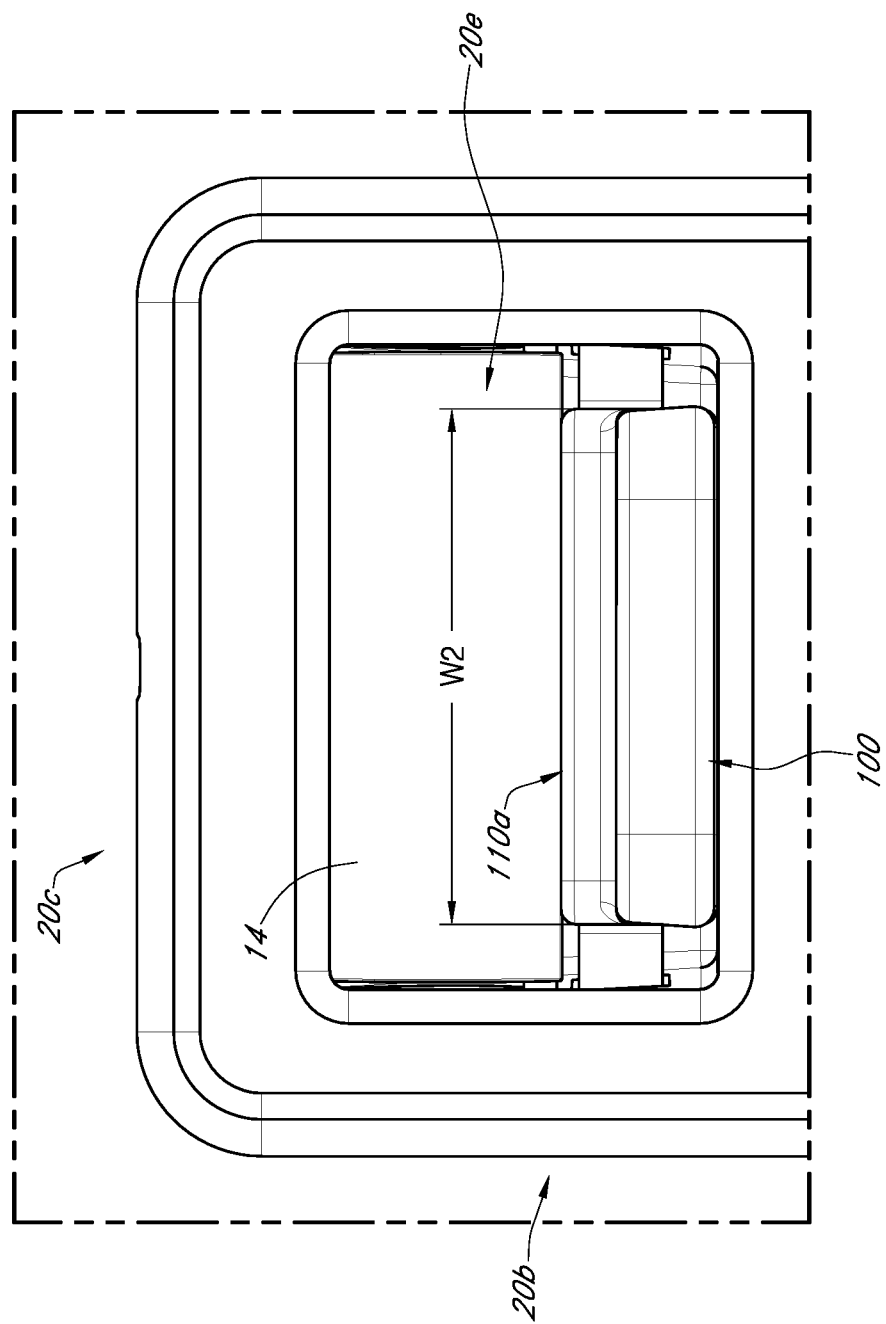
FIG. 22 is a top plan view of the rear portion of the charging station with adjustable holder back in the first position of FIG. 13 to accommodate the thickness of the portable electronic device shown in FIG. 21.

Turning to FIG. 22, depicted therein is a top plan view of the rear portion shown in FIG. 21 of housing 20 coupled with the with one of the plurality of device 100 with width dimension W2 accommodated by side assembly 16 and side assembly 18 of holder assembly 10 and including device back 110a combined to have thickness dimension T1 with curvilinearly formed semi-rigid sheet assembly 14 in the first position of FIG. 13 to accommodate thickness dimension T1.

Figure 23:
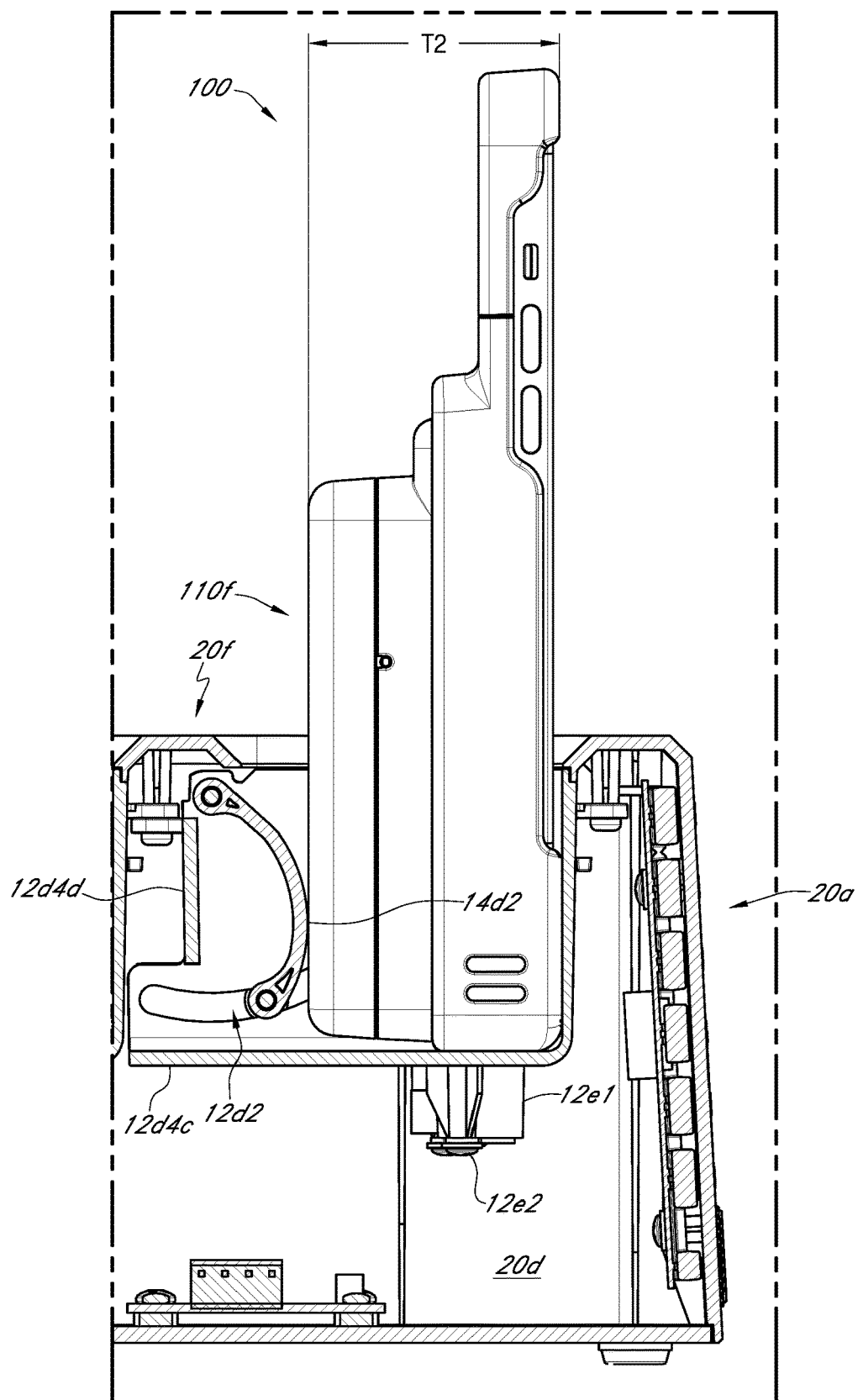
FIG. 23 is a side elevational cross-sectional view of a front portion of the charging station with adjustable holder back relatively close to the second position of FIG. 17 to accommodate the thickness of one of the plurality portable electronic devices taken along the 23-23 cutline of FIG. 20B.

Turning to FIG. 23, depicted therein is a side elevational cross-sectional view of a front portion of housing 20 with curvilinearly formed semi-rigid sheet assembly 14 of holder assembly 10 holding device back 110f including device backs 110 combined to have thickness dimension T2. Depicted implementation of curvilinearly formed semi-rigid sheet assembly 14 is shown in the second position of FIG. 17 to accommodate thickness dimension T2 taken along the 23-23 cutline of FIG. 20B.

Figure 24:
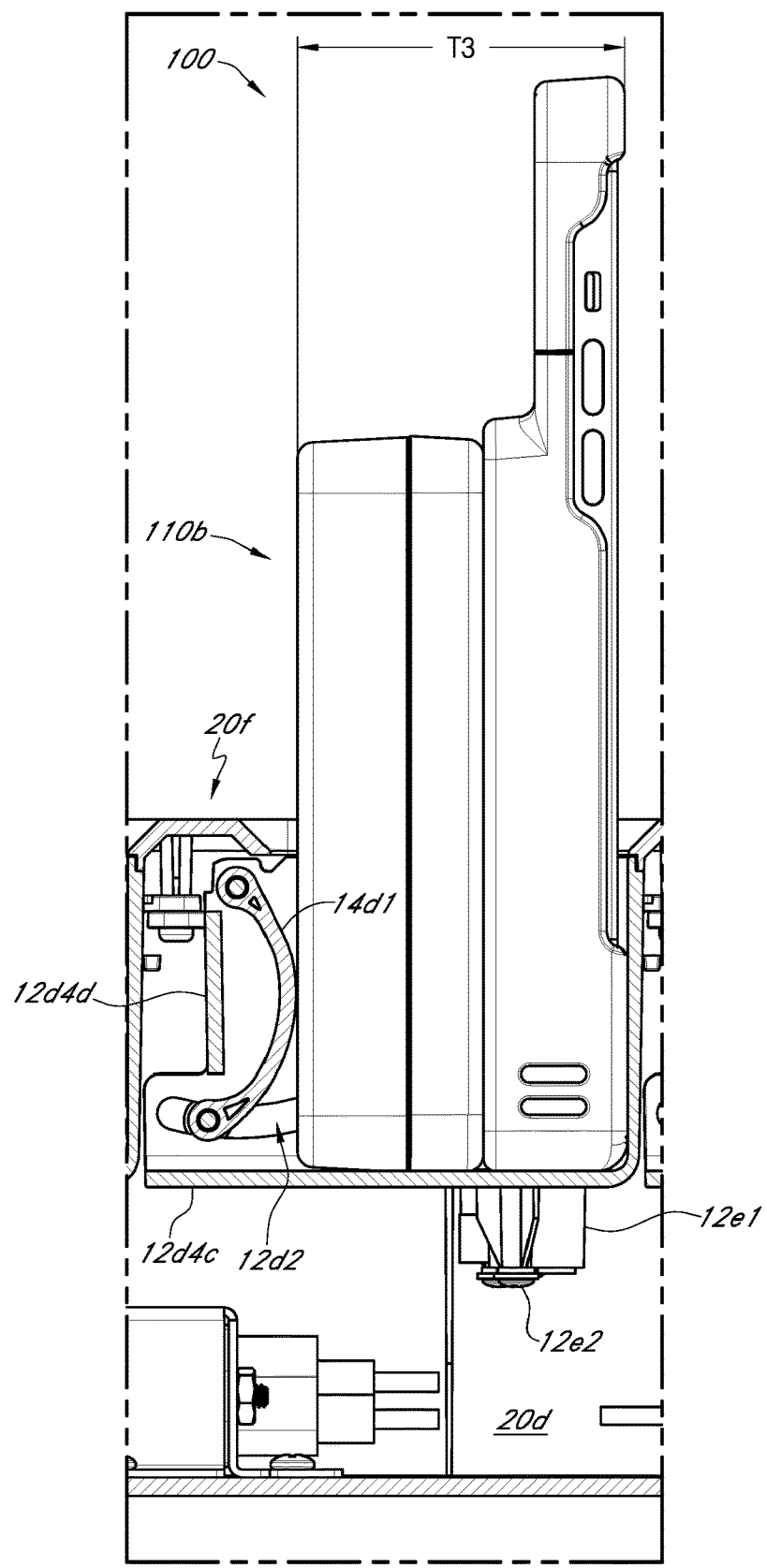
FIG. 24 is a side elevational cross-sectional view of a mid portion of the charging station with adjustable holder in the third position of FIG. 18 to accommodate the thickness of one of the plurality portable electronic devices taken along the 24-24 cutline of FIG. 20C.

Turning to FIG. 24, depicted therein is a side elevational cross-sectional view of a mid portion of housing 20 with curvilinearly formed semi-rigid sheet assembly 14 of holder assembly 10 holding device back 110b including device backs 110 combined to have thickness dimension T3. Depicted implementation of curvilinearly formed semi-rigid sheet assembly 14 is shown in the third position of FIG. 18 to accommodate thickness dimension T3 taken along the 24-24 cutline of FIG. 20C.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system for a portable electronic device, the system comprising:
   (I) a container assembly including
      (A) an interior,
      (B) a first side in part defining the interior, the first side including an aperture and a curvilinear slot, and
      (C) a second side in part defining the interior, the second side including an aperture and a curvilinear slot,
      wherein the first side and the second side are opposingly spaced from one another; and
   (II) a curvilinearly formed semi-rigid sheet, at least a portion of the curvilinearly formed semi-rigid sheet positioned in the interior of the container assembly between the first side of the container assembly and the second side of the container assembly, the curvilinearly formed semi-rigid sheet including
      (A) a first side,
      (B) a second side extending perpendicular with the first side, the second side including a first corner aperture and a second corner aperture,
      (C) a third side extending parallel with the first side, and
      (D) a fourth side extending perpendicular with the third side, the fourth side including a first corner aperture and a second corner aperture,
   wherein the first corner aperture of the second side of the curvilinearly formed semi-rigid sheet is coupled with the aperture of the first side of the container assembly,
   wherein the second corner aperture of the second side of the curvilinearly formed semi-rigid sheet is coupled with the curvilinear slot of the first side of the container assembly,
   wherein the first corner aperture of the fourth side of the curvilinearly formed semi-rigid sheet is coupled with the aperture of the second side of the container assembly, and
   wherein the second corner aperture of the fourth side of the curvilinearly formed semi-rigid sheet is coupled with the curvilinear slot of the second side of the container assembly.

2. The system of claim 1
   wherein the first corner aperture of the second side of the curvilinearly formed semi-rigid sheet is movably coupled with the aperture of the first side of the container assembly,
   wherein the second corner aperture of the second side of the curvilinearly formed semi-rigid sheet is movably coupled with the curvilinear slot of the first side of the container assembly,
   wherein the first corner aperture of the fourth side of the curvilinearly formed semi-rigid sheet is movably coupled with the aperture of the second side of the container assembly, and
   wherein the second corner aperture of the fourth side of the curvilinearly formed semi-rigid sheet is movably coupled with the curvilinear slot of the second side of the container assembly.

3. The system of claim 2
   wherein the first corner aperture of the second side of the curvilinearly formed semi-rigid sheet is rotatably coupled with the aperture of the first side of the container assembly,
   wherein the second corner aperture of the second side of the curvilinearly formed semi-rigid sheet is slidably coupled with the curvilinear slot of the first side of the container assembly,
   wherein the first corner aperture of the fourth side of the curvilinearly formed semi-rigid sheet is rotatably coupled with the aperture of the second side of the container assembly, and
   wherein the second corner aperture of the fourth side of the curvilinearly formed semi-rigid sheet is slidably coupled with the curvilinear slot of the second side of the container assembly.

4. The system of claim 1
   wherein the curvilinear slot of the first side of the container assembly is semicircular, and
   wherein the curvilinear slot of the second side of the container assembly is semicircular.

5. The system of claim 4
   wherein the aperture of the first side of the container assembly is distanced a constant distance from the curvilinear slot of the first side of the container assembly along the curvilinear slot of the first side of the container assembly, and
   wherein the aperture of the second side of the container assembly is distanced a constant distance from the curvilinear slot of the second side of the container assembly along the curvilinear slot of the second side of the container assembly.

6. The system of claim 1
   wherein when the second corner aperture of the second side of the curvilinearly formed semi-rigid sheet is in a first position with respect to the curvilinear slot of the first side of the container assembly, a portion of the second side of the curvilinearly formed semi-rigid sheet is visible from a side elevational view of the first side of the container assembly if the container assembly is uncoupled with any housing, and
   wherein when the second corner aperture of the second side of the curvilinearly formed semi-rigid sheet is in a second position with respect to the curvilinear slot of the first side of the container assembly, the portion of the second side of the curvilinearly formed semi-rigid sheet is hidden from a side elevational view of the first side of the container assembly if the container assembly is uncoupled with any housing.

7. The system of claim 1
   wherein the second side of the curvilinearly formed semi-rigid sheet includes an arched profile between the first corner aperture and the second corner aperture of the second side of the curvilinearly formed semi-rigid sheet,
   wherein the fourth side of the curvilinearly formed semi-rigid sheet includes an arched profile between the first corner aperture and the second corner aperture of the fourth side of the curvilinearly formed semi-rigid sheet, and wherein the arched profile of the second side of the curvilinearly formed semi-rigid sheet is identical to the arched profile of the fourth side of the curvilinearly formed semi-rigid sheet.

8. The system of claim 1 further including a first coupler and a second coupler,
wherein the first coupler includes a coupler portion, a pin portion extending from the coupler portion, and a head extending from the pin portion,
wherein the coupler portion of the first coupler is fixedly coupled to the second corner aperture of the second side of the curvilinearly formed semi-rigid sheet,
wherein at least a portion of the pin portion of the first coupler is positioned within the curvilinear slot of the first side of the container assembly,
wherein the head of the first coupler is positioned outside of the curvilinear slot of the first side of the container assembly,
wherein the second coupler includes a coupler portion, a pin portion extending from the coupler portion, and a head extending from the pin portion,
wherein the coupler portion of the second coupler is fixedly coupled to the second corner aperture of the fourth side of the curvilinearly formed semi-rigid sheet,
wherein at least a portion of the pin portion of the second coupler is positioned within the curvilinear slot of the second side of the container assembly, and
wherein the head of the second coupler is positioned outside of the curvilinear slot of the second side of the container assembly.

9. The system of claim 8 further including a first spring, a second spring, a first hook, and a second hook,
wherein the first spring includes a first end and a second end,
wherein the second spring includes a first end and a second end,
wherein the first hook protrudes from the first side of the container assembly,
wherein the second hook protrudes from the second side of the container assembly,
wherein the first end of the first spring is coupled to the pin portion of the first coupler,
wherein the second end of the first spring is coupled to the first hook,
wherein the first end of the second spring is coupled to the pin portion of the second coupler, and
wherein the second end of the second spring is coupled to the second hook.

10. A system for a portable electronic device, the system comprising:
(I) a container assembly including
(A) a first side including an aperture and a curvilinear slot, and
(B) a second side including an aperture and a curvilinear slot,
wherein the first side and the second side are oppposingly spaced from one another; and
(II) a curvilinearly formed semi-rigid sheet, at least a portion of the curvilinearly formed semi-rigid sheet extending between the first side of the container assembly and the second side of the container assembly, the curvilinearly formed semi-rigid sheet including
(A) a first side,
(B) a second side extending perpendicular with the first side, the second side including a first portion and a second portion, the first portion spaced closer to the first side than the second portion is spaced to the first side,
(C) a third side extending parallel with the first side, and
(D) a fourth side extending perpendicular with the third side, the fourth side including a first portion and a second portion, the first portion spaced closer to the first side than the second portion is spaced to the first side,
wherein the first portion of the second side of the curvilinearly formed semi-rigid sheet is coupled with the aperture of the first side of the container assembly,
wherein the second portion of the second side of the curvilinearly formed semi-rigid sheet is coupled with the curvilinear slot of the first side of the container assembly,
wherein the first portion of the fourth side of the curvilinearly formed semi-rigid sheet is coupled with the aperture of the second side of the container assembly, and
wherein the second portion of the fourth side of the curvilinearly formed semi-rigid sheet is coupled with the curvilinear slot of the second side of the container assembly.

11. The system of claim 10
wherein the first portion of the second side of the curvilinearly formed semi-rigid sheet is movably coupled with the aperture of the first side of the container assembly,
wherein the second portion of the second side of the curvilinearly formed semi-rigid sheet is movably coupled with the curvilinear slot of the first side of the container assembly,
wherein the first portion of the fourth side of the curvilinearly formed semi-rigid sheet is movably coupled with the aperture of the second side of the container assembly, and
wherein the second portion of the fourth side of the curvilinearly formed semi-rigid sheet is movably coupled with the curvilinear slot of the second side of the container assembly.

12. The system of claim 11
wherein the first portion of the second side of the curvilinearly formed semi-rigid sheet is rotatably coupled with the aperture of the first side of the container assembly,
wherein the second portion of the second side of the curvilinearly formed semi-rigid sheet is slidably coupled with the curvilinear slot of the first side of the container assembly,
wherein the first portion of the fourth side of the curvilinearly formed semi-rigid sheet is rotatably coupled with the aperture of the second side of the container assembly, and
wherein the second portion of the fourth side of the curvilinearly formed semi-rigid sheet is slidably coupled with the curvilinear slot of the second side of the container assembly.

13. The system of claim 10
wherein distance from the aperture of the first side of the container assembly to the curvilinear slot of the first side of the container assembly remains constant along the curvilinear slot of the first side of the container assembly, and
wherein distance from the aperture of the second side of the container assembly to the curvilinear slot of the second side of the container assembly remains constant along the curvilinear slot of the second side of the container assembly.

14. The system of claim 10
wherein the second side of the curvilinearly formed semi-rigid sheet includes an arched profile between the first portion and the second portion of the second side of the curvilinearly formed semi-rigid sheet,
wherein the fourth side of the curvilinearly formed semi-rigid sheet includes an arched profile between the first portion and the second portion of the fourth side of the curvilinearly formed semi-rigid sheet, and
wherein the arched profile of the second side of the curvilinearly formed semi-rigid sheet is the same as the arched profile of the fourth side of the curvilinearly formed semi-rigid sheet.

15. The system of claim 10 further including a first coupler and a second coupler,
wherein the first coupler includes a coupler portion, a pin portion extending from the coupler portion, and a head extending from the pin portion,
wherein the coupler portion of the first coupler is fixedly coupled to the second portion of the second side of the curvilinearly formed semi-rigid sheet,
wherein at least a portion of the pin portion of the first coupler is positioned within the curvilinear slot of the first side of the container assembly,
wherein the head of the first coupler is positioned outside of the curvilinear slot of the first side of the container assembly,
wherein the second coupler includes a coupler portion, a pin portion extending from the coupler portion, and a head extending from the pin portion,
wherein the coupler portion of the second coupler is fixedly coupled to the second portion of the fourth side of the curvilinearly formed semi-rigid sheet,
wherein at least a portion of the pin portion of the second coupler is positioned within the curvilinear slot of the second side of the container assembly, and
wherein the head of the second coupler is positioned outside of the curvilinear slot of the second side of the container assembly.

16. The system of claim 15 further including a first spring, a second spring, a first hook, and a second hook,
wherein the first spring includes a first end and a second end,
wherein the second spring includes a first end and a second end,
wherein the first hook protrudes from the first side of the container assembly,
wherein the second hook protrudes from the second side of the container assembly,
wherein the first end of the first spring is coupled to the pin portion of the first coupler,
wherein the second end of the first spring is coupled to the first hook,
wherein the first end of the second spring is coupled to the pin portion of the second coupler, and
wherein the second end of the second spring is coupled to the second hook.

17. A system for a portable electronic device, the system comprising:
(I) a container assembly including
(A) a first side including a curvilinear slot, and
(B) a second side including a curvilinear slot,
wherein the first side and the second side are oppposingly spaced from one another; and
(II) a curvilinearly formed semi-rigid sheet, at least a portion of the curvilinearly formed semi-rigid sheet extending between the first side of the container assembly and the second side of the container assembly, the curvilinearly formed semi-rigid sheet including
(A) a first side,
(B) a second side extending perpendicular with the first side, the second side including a first portion and a second portion,
(C) a third side extending parallel with the first side, and
(D) a fourth side extending perpendicular with the third side, the fourth side including a first portion and a second portion,
wherein the second portion of the second side of the curvilinearly formed semi-rigid sheet is coupled with the curvilinear slot of the first side of the container assembly, and
wherein the second portion of the fourth side of the curvilinearly formed semi-rigid sheet is coupled with the curvilinear slot of the second side of the container assembly.

18. The system of claim 17
wherein the second portion of the second side of the curvilinearly formed semi-rigid sheet is movably coupled with the curvilinear slot of the first side of the container assembly, and
wherein the second portion of the fourth side of the curvilinearly formed semi-rigid sheet is movably coupled with the curvilinear slot of the second side of the container assembly.

19. The system of claim 18
wherein the second portion of the second side of the curvilinearly formed semi-rigid sheet is slidably coupled with the curvilinear slot of the first side of the container assembly, and
wherein the second portion of the fourth side of the curvilinearly formed semi-rigid sheet is slidably coupled with the curvilinear slot of the second side of the container assembly.

20. The system of claim 17 further including a first coupler, a second coupler, a first spring, a second spring, a first hook, and a second hook,
wherein the first coupler includes a coupler portion, a pin portion extending from the coupler portion, and a head extending from the pin portion,
wherein the coupler portion of the first coupler is fixedly coupled to the second portion of the second side of the curvilinearly formed semi-rigid sheet,
wherein at least a portion of the pin portion of the first coupler is positioned within the curvilinear slot of the first side of the container assembly,
wherein the head of the first coupler is positioned outside of the curvilinear slot of the first side of the container assembly,
wherein the second coupler includes a coupler portion, a pin portion extending from the coupler portion, and a head extending from the pin portion,
wherein the coupler portion of the second coupler is fixedly coupled to the second portion of the fourth side of the curvilinearly formed semi-rigid sheet,
wherein at least a portion of the pin portion of the second coupler is positioned within the curvilinear slot of the second side of the container assembly,
wherein the head of the second coupler is positioned outside of the curvilinear slot of the second side of the container assembly, wherein the first spring includes a first end and a second end, wherein the second spring includes a first end and a second end, wherein the first hook protrudes from the first side of the container assembly, wherein the second hook protrudes from the second side of the container assembly, wherein the first end of the first spring is coupled to the pin portion of the first coupler, wherein the second end of the first spring is coupled to the first hook, wherein the first end of the second spring is coupled to the pin portion of the second coupler, and wherein the second end of the second spring is coupled to the second hook.

\* \* \* \* \*